US007562216B2

(12) United States Patent
Borthakur et al.

(10) Patent No.: US 7,562,216 B2
(45) Date of Patent: Jul. 14, 2009

(54) SYSTEM AND METHOD FOR APPLYING A FILE SYSTEM SECURITY MODEL TO A QUERY SYSTEM

(75) Inventors: Dhrubajyoti Borthakur, San Jose, CA (US); Nur Premo, San Jose, CA (US); Joseph Pasqua, Menlo Park, CA (US)

(73) Assignee: Symantec Operating Corporation, Mountain View, CA (US)

( * ) Notice: Subject to any disclaimer, the term of this patent is extended or adjusted under 35 U.S.C. 154(b) by 671 days.

(21) Appl. No.: 10/878,826

(22) Filed: Jun. 28, 2004

(65) Prior Publication Data

US 2005/0289354 A1 Dec. 29, 2005

(51) Int. Cl.
*H04L 29/00* (2006.01)

(52) U.S. Cl. ........................... 713/165; 713/166; 726/2; 726/5; 726/7; 726/18

(58) Field of Classification Search ..................... 726/2, 726/5, 7, 18; 713/165, 166
See application file for complete search history.

(56) References Cited

U.S. PATENT DOCUMENTS

| | | | | |
|---|---|---|---|---|
| 5,701,469 | A | 12/1997 | Brandli | |
| 5,890,147 | A | 3/1999 | Peltonen | |
| 5,907,837 | A | 5/1999 | Ferrel | |
| 6,026,474 | A | 2/2000 | Carter | |
| 6,240,401 | B1 | 5/2001 | Oren | |
| 6,240,429 | B1 | 5/2001 | Thornton | |
| 6,253,208 | B1 * | 6/2001 | Wittgreffe et al. | 707/104.1 |
| 6,256,636 | B1 * | 7/2001 | Choy | 707/103 Z |
| 6,286,013 | B1 | 9/2001 | Reynolds | |
| 6,374,260 | B1 | 4/2002 | Hoffert | |
| 6,389,538 | B1 | 5/2002 | Gruse | |
| 6,522,268 | B2 | 2/2003 | Belu | |
| 6,594,664 | B1 * | 7/2003 | Estrada et al. | 707/10 |
| 6,922,784 | B2 * | 7/2005 | Phillips et al. | 726/18 |
| 6,938,083 | B1 | 8/2005 | Teague | |
| 6,970,866 | B1 | 11/2005 | Pravetz | |
| 6,978,381 | B1 * | 12/2005 | Te et al. | 726/18 |
| 7,013,331 | B2 | 3/2006 | Das | |
| 7,020,658 | B1 | 3/2006 | Hill | |

(Continued)

OTHER PUBLICATIONS

Daniele Braga, Alessandro Campi, and Stefano Ceri; "XQBE: A Graphical Interface for XQuery Engines"; Feb. 19, 2004; EDBT 2004, LNCS 2992, pp. 848-850.*

(Continued)

*Primary Examiner*—Carl Colin
(74) *Attorney, Agent, or Firm*—Meyertons Hood Kivlin Kowert & Goetzel, P.C.; B. Noël Kivlin; Anthony M. Petro

(57) ABSTRACT

A system and method for applying a file system security model to a query system. In one embodiment, the system may include a storage device configured to store data and a file system configured to manage access to the storage device, to store file system content, and to implement a first security model, where the first security model is configured to control access to the file system content. The system may further include a query system configured to query the file system content, and security mapping functionality configured to apply the first security model to the query system.

27 Claims, 9 Drawing Sheets

U.S. PATENT DOCUMENTS

| | | | | |
|---|---|---|---|---|
| 7,058,624 | B2 | 6/2006 | Masters | |
| 7,100,195 | B1 * | 8/2006 | Underwood | 726/2 |
| 7,115,919 | B2 * | 10/2006 | Kodama | 257/201 |
| 7,188,118 | B2 | 3/2007 | Borthakur | |
| 2001/0025311 | A1 | 9/2001 | Arai | |
| 2002/0049731 | A1 | 4/2002 | Kotani | |
| 2003/0093556 | A1 | 5/2003 | Yeung | |
| 2003/0105734 | A1 * | 6/2003 | Hitchen et al. | 707/1 |
| 2003/0120684 | A1 * | 6/2003 | Zuili et al. | 707/200 |
| 2003/0151633 | A1 | 8/2003 | George | |
| 2003/0154271 | A1 | 8/2003 | Baldwin | |
| 2003/0172368 | A1 | 9/2003 | Alumbaugh | |
| 2003/0187848 | A1 * | 10/2003 | Ghukasyan et al. | 707/9 |
| 2003/0236650 | A1 * | 12/2003 | Miura et al. | 702/188 |
| 2004/0002942 | A1 | 1/2004 | Pudipeddi | |
| 2004/0059866 | A1 | 3/2004 | Patel | |
| 2004/0225730 | A1 | 11/2004 | Brown | |
| 2004/0243554 | A1 | 12/2004 | Broder | |
| 2005/0015461 | A1 | 1/2005 | Richard | |
| 2005/0038813 | A1 | 2/2005 | Apparao | |
| 2005/0050107 | A1 | 3/2005 | Mane | |
| 2005/0114363 | A1 | 5/2005 | Borthakur | |
| 2005/0114381 | A1 | 5/2005 | Borthakur | |
| 2005/0114406 | A1 | 5/2005 | Borthakur | |
| 2005/0132220 | A1 * | 6/2005 | Chang et al. | 713/201 |
| 2005/0198010 | A1 | 9/2005 | Borthakur | |
| 2006/0004759 | A1 | 1/2006 | Borthakur | |
| 2006/0004787 | A1 | 1/2006 | Borthakur | |
| 2006/0059204 | A1 | 3/2006 | Borthakur | |
| 2006/0074912 | A1 | 4/2006 | Borthakur | |

OTHER PUBLICATIONS

Ji-Hoon Kang, Chul-Soo Kim, Eun-Jeong Ko; "An XQuery Engine for Digital Library Systems"; Proceedings of the 2003 Joint Conference on Digital Libraries (JCDL'03); 2003 IEEE; p. 1.*

"The Business Rationale for Distributed (Remote) Document Capture," Verity White Paper, Oct. 2003, downloaded from http://www.cardiff.com/cms/groups/public/documents/collateral/mk0535.pdf, 12 pages.

"Native XML Management With Documentum," Documentum Technical White Paper, Jul. 2003, downloaded from http://software.emc.com/collateral/content_management/documentum_family/wp_tech_xml.pdf, 15 pages.

Autonomy XML White Paper, Oct. 2003, downloaded from http://www.autonomy.com/content/downloads/White%20Papers/index.en.html, 11 pages.

Autonomy Technology White Paper, Nov. 2003, downloaded from http://www.autonomy.com/content/downloads/White%20Papers/index.en.html, 19 pages.

"DCMI Abstract Data Model," Dublin Core Metadata Initiative, Feb. 2004, downloaded from http://www.ukoln.ac.uk/metadata/dcmi/abstract-model/2004-02-04/, 17 pages.

Staples et al., "The Fedora Project: An Open-source Digital Object Repository Management System," in D-Lib Magazine, v. 9, No. 4, Apr. 2003, downloaded from http://web.archive.org/web/20040203065018/www.dlib.org/april03/staples/04staples.html, 12 pages.

Wildermuth, "A Developer's Perspective on WinFS: Part 1," Mar. 2004, downloaded from http://web.archive.org/web/20050414063209/http://msdn.microsoft.com/data/winfs/default.aspx?pull=/library/en-us/dnwinfsta/html/winfsdevpersp.asp, 10 pages.

* cited by examiner

SYSTEM AND METHOD FOR APPLYING A FILE SYSTEM SECURITY MODEL TO A QUERY SYSTEM

BACKGROUND OF THE INVENTION

1. Field of the Invention

This invention relates to computer systems and, more particularly, to file-based storage systems.

2. Description of the Related Art

Computer systems often process large quantities of information, including application data and executable code configured to process such data. In numerous embodiments, computer systems provide various types of mass storage devices configured to store data, such as magnetic and optical disk drives, tape drives, etc. To provide a regular and systematic interface through which to access their stored data, such storage devices are frequently organized into hierarchies of files by software such as an operating system, or a file system included within or configured to interface with an operating system. Often a file defines a minimum level of data granularity that a user can manipulate within a storage device, although various applications and operating system processes may operate on data within a file at a lower level of granularity than the entire file.

In some file-based computer systems, various types of information about files, also referred to as metadata, may be stored in addition to the files themselves. Various file system interfaces, such as application programming interfaces (APIs) may be provided to allow users to access files and metadata. In some instances, these interfaces may support various security features with respect to files and metadata, such that different users may have different privileges with respect to different data. For example, a file system may distinguish between a file owner and a non-owner, allowing the owner to perform certain operations that non-owners may not (such as, e.g., modification or deletion of the owned file).

In some computer system embodiments, additional paths for accessing file system data or metadata may be provided externally to the file system. For example, a separate query system may be provided to allow file data or metadata to be queried according to a query language. However, such alternate paths for accessing file system data or metadata are typically not subject to the security features imposed by the file system. Consequently, the security of file system contents may be compromised. For example, if a query system does not recognize a file owner vs. non-owner distinction established by a file system, a non-owner of a given file may be able to exploit the contents of the file via the query system (e.g., to read or modify file contents) in a way that would be disallowed by the file system. Such security discrepancies may lead to a compromise in computer system integrity, data corruption or theft, or other deleterious consequences.

SUMMARY

Various embodiments of a system and method for applying a file system security model to a query system are disclosed. In one embodiment, the system may include a storage device configured to store data and a file system configured to manage access to the storage device, to store file system content, and to implement a first security model, where the first security model is configured to control access to the file system content. The system may further include a query system configured to query the file system content, and security mapping functionality configured to apply the first security model to the query system.

In one specific implementation of the system, the query system may be further configured to store an index of file system content in an index format, and the security mapping functionality may include a security converter corresponding to the first security model. The security mapping functionality applying the first security model to the query system may include the security converter mapping security information corresponding to a given file system content item to the index format, and the query system may be further configured to store the mapped security information in the index.

In another specific implementation of the system, the query system may be configured to implement a second security model, and applying said first security model to the query system may include mapping the first security model to the second security model.

A method is also contemplated which, in one embodiment, may include storing file system content, implementing a first security model, where the first security model is configured to control access to said file system content, and applying the first security model to a query system configured to query the file system content.

Figure 1:
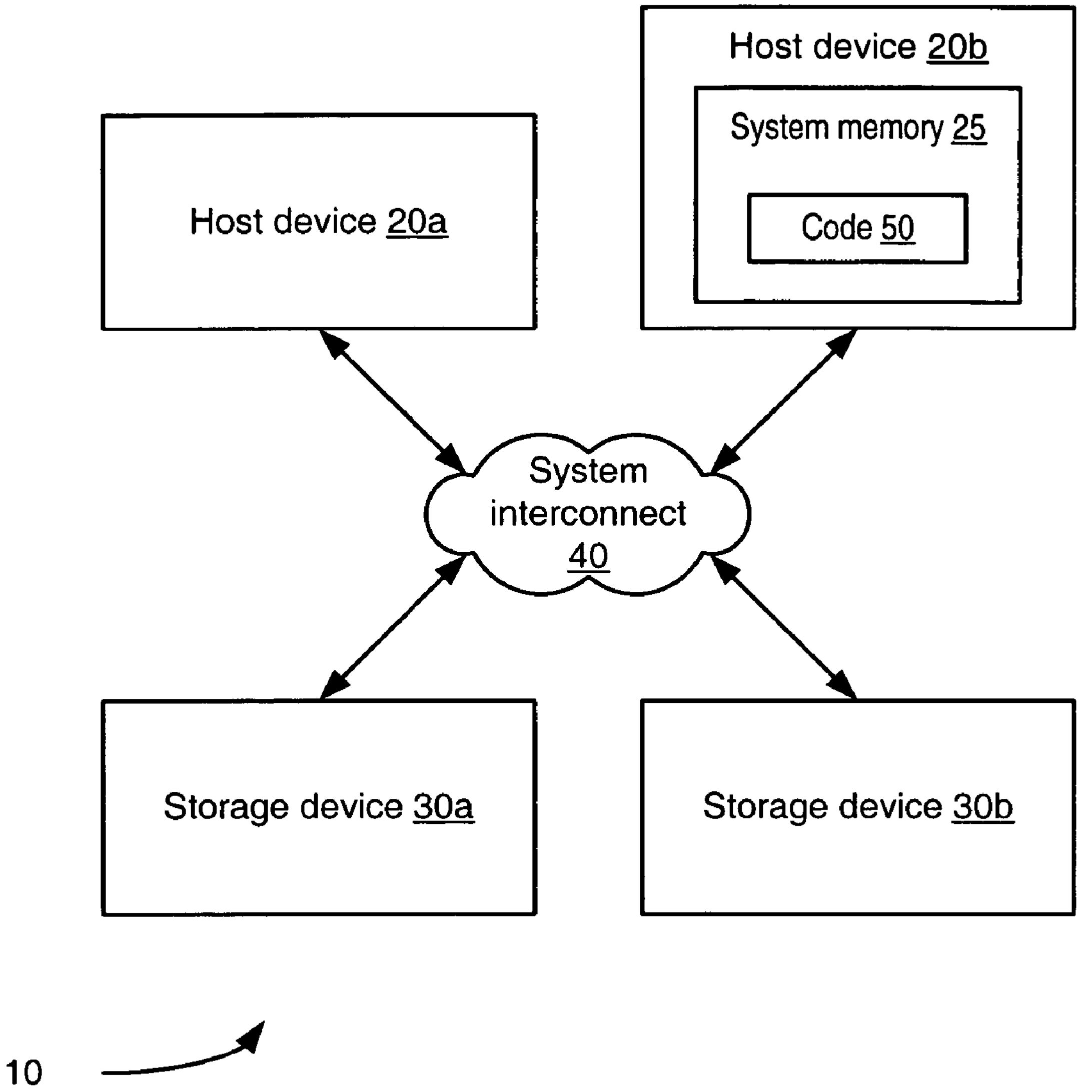
FIG. 1 is a block diagram illustrating one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System Overview

Turning now to FIG. 1, a block diagram of one embodiment of a computer system is shown. In the illustrated embodiment, system 10 includes a plurality of host devices 20*a* and 20*b* coupled to a plurality of storage devices 30*a* and 30*b* via a system interconnect 40. Further, host device 20*b* includes a system memory 25 in the illustrated embodiment. For simplicity of reference, elements referred to herein by a reference number followed by a letter may be referred to collectively by the reference number alone. For example, host devices 20*a* and 20*b* and storage devices 30*a* and 30*b* may be referred to collectively as host devices 20 and storage devices 30.

In various embodiments of system 10, host devices 20 may be configured to access data stored on one or more of storage devices 30. In one embodiment, system 10 may be implemented within a single computer system, for example as an integrated storage server. In such an embodiment, for example, host devices 20 may be individual processors, system memory 25 may be a cache memory such as a static RAM (SRAM), storage devices 30 may be mass storage devices such as hard disk drives or other writable or rewritable media, and system interconnect 40 may include a peripheral bus interconnect such as a Peripheral Component Interface (PCI) bus. In some such embodiments, system interconnect 40 may include several types of interconnect between host devices 20 and storage devices 30. For example, system interconnect 40 may include one or more processor buses (not shown) configured for coupling to host devices 20, one or more bus bridges (not shown) configured to couple the processor buses to one or more peripheral buses, and one or more storage device interfaces (not shown) configured to couple the peripheral buses to storage devices 30. Storage device interface types may in various embodiments include the Small Computer System Interface (SCSI), AT Attachment Packet Interface (ATAPI), Firewire, and/or Universal Serial Bus (USB), for example, although numerous alternative embodiments including other interface types are possible and contemplated.

In an embodiment of system 10 implemented within a single computer system, system 10 may be configured to provide most of the data storage requirements for one or more other computer systems (not shown), and may be configured to communicate with such other computer systems. In an alternative embodiment, system 10 may be configured as a distributed storage system, such as a storage area network (SAN), for example. In such an embodiment, for example, host devices 20 may be individual computer systems such as server systems, system memory 25 may be comprised of one or more types of dynamic RAM (DRAM), storage devices 30 may be standalone storage nodes each including one or more hard disk drives or other types of storage, and system interconnect 40 may be a communication network such as Ethernet or Fibre Channel. A distributed storage configuration of system 10 may facilitate scaling of storage system capacity as well as data bandwidth between host and storage devices.

In still another embodiment, system 10 may be configured as a hybrid storage system, where some storage devices 30 are integrated within the same computer system as some host devices 20, while other storage devices 30 are configured as standalone devices coupled across a network to other host devices 20. In such a hybrid storage system, system interconnect 40 may encompass a variety of interconnect mechanisms, such as the peripheral bus and network interconnect described above.

It is noted that although two host devices 20 and two storage devices 30 are illustrated in FIG. 1, it is contemplated that system 10 may have an arbitrary number of each of these types of devices in alternative embodiments. Also, in some embodiments of system 10, more than one instance of system memory 25 may be employed, for example in other host devices 20 or storage devices 30. Further, in some embodiments, a given system memory 25 may reside externally to host devices 20 and storage devices 30 and may be coupled directly to a given host device 20 or storage device 30 or indirectly through system interconnect 40.

In many embodiments of system 10, one or more host devices 20 may be configured to execute program instructions and to reference data, thereby performing a computational function. In the illustrated embodiment, such program instructions and/or data are stored as code 50 within system memory 25. In some embodiments, system memory 25 may be one embodiment of a computer-accessible medium configured to store such program instructions and data. However, in other embodiments, program instructions and/or data may be received, sent or stored upon different types of computer-accessible media. Generally speaking, a computer-accessible medium may include storage media or memory media such as magnetic or optical media, e.g., disk or CD-ROM included in system 10 as storage devices 30. A computer-accessible medium may also include volatile or non-volatile media such as RAM (e.g. SDRAM, DDR SDRAM, RDRAM, SRAM, etc.), ROM, etc, that may be included in some embodiments of system 10 as system memory 25. Further, a computer-accessible medium may include transmission media or signals such as electrical, electromagnetic, or digital signals, conveyed via a communication medium such as network and/or a wireless link, which may be included in some embodiments of system 10 as system interconnect 40.

In some embodiments, program instructions and data stored within a computer-accessible medium as described above may implement an operating system that may in turn provide an environment for execution of various application programs. For example, a given host device 20 may be configured to execute a version of the Microsoft Windows operating system, the Unix/Linux operating system, the Apple Macintosh operating system, or another suitable operating system. Additionally, a given host device may be configured to execute application programs such as word processors, web browsers and/or servers, email clients and/or servers, and multimedia applications, among many other possible applications. It is contemplated that in some embodiments, any of the software methods or modules described in greater detail below (whether operating system components, applications, or other types of software components) may be implemented as one or more instances of code 50 within one or more instances of a computer-accessible medium, such as system memory 25, for example.

During execution on a given host device 20, either the operating system or a given application may generate requests for data to be loaded from or stored to a given storage device 30. For example, code corresponding to portions of the operating system or an application itself may be stored on a given storage device 30, so in response to invocation of the desired operation system routine or application program, the corresponding code may be retrieved for execution. Similarly, operating system or application execution may produce data to be stored.

Figure 2:
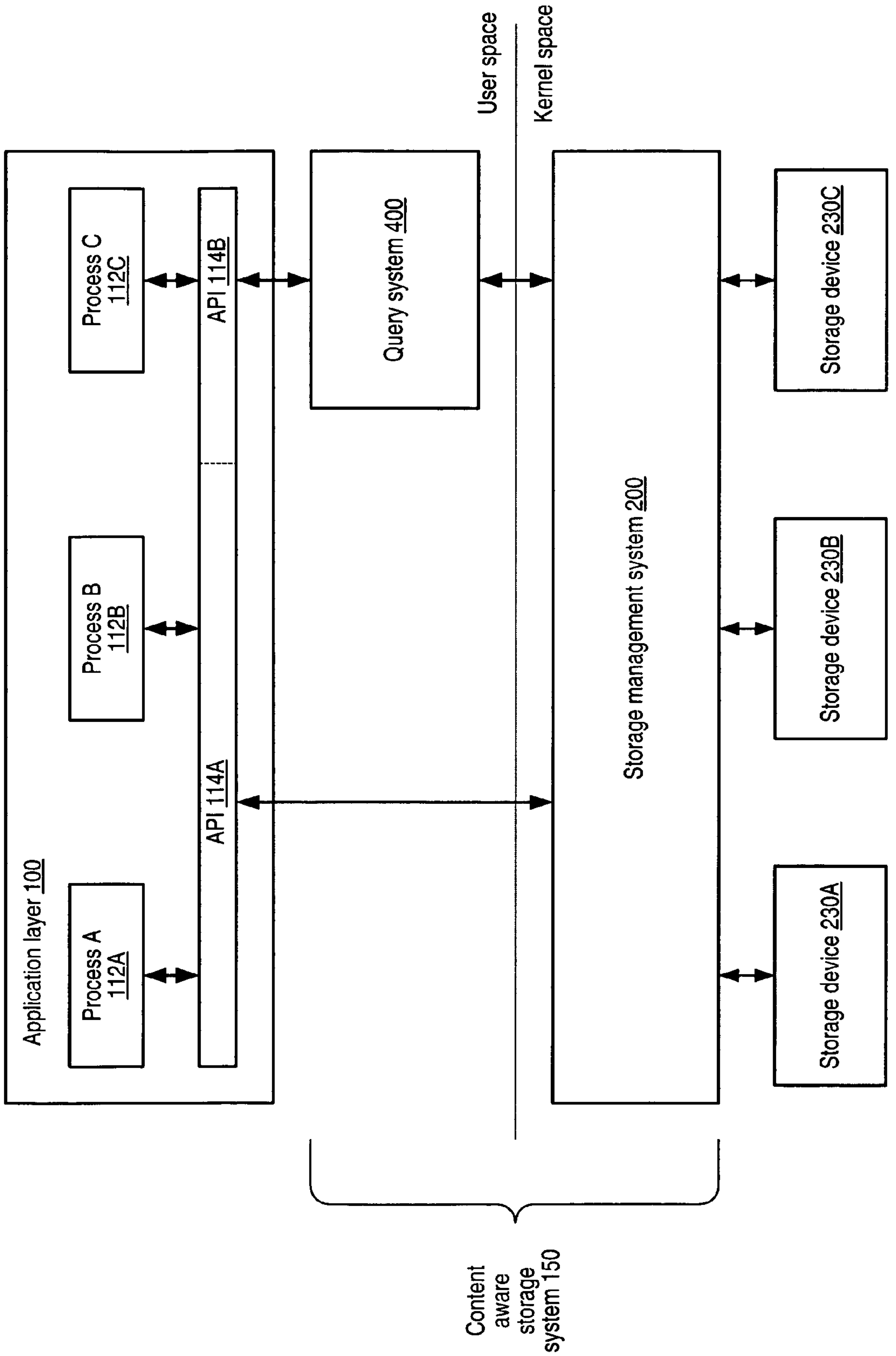
FIG. 2 is a block diagram illustrating one embodiment of a software-based storage system architecture and its interface to storage devices.

In some embodiments, the movement and processing of data stored on storage devices 30 may be managed by a software-based storage system. One such embodiment is illustrated in FIG. 2, which shows an application layer 100 interfacing to a plurality of storage devices 230A-C via a content aware storage system 150. Some modules illustrated within FIG. 2 may be configured to execute in a user execution mode or "user space", while others may be configured to execute in a kernel execution mode or "kernel space." In the illustrated embodiment, application layer 100 includes a plurality of user space software processes 112A-C. Each process interfaces to storage system 150 via a plurality of application programming interfaces (APIs) 114A-B, such that each of processes 112 may have access to each of APIs 114A-B. Storage system 150 includes a kernel space storage management system 200, shown interfacing to application layer 100 via API 114A, and a user space query system 400, shown interfacing to application layer 100 via API 114B. In the illustrated embodiment, storage management system 200 further interfaces to storage devices 230A-C.

It is contemplated that in some embodiments, an arbitrary number of processes 112 and/or storage devices 230 may be implemented. It is further contemplated that in some embodiments, all or portions of query system 400 may be implemented in kernel space, and that in some embodiments, processes configured to execute in kernel space may be configured to access storage system 150 via APIs 114 or other APIs specific to kernel space processes.

In one embodiment, each of processes 112 may correspond to a given user application, and each may be configured to access storage devices 230A-C through calls to APIs 114. APIs 114 provide processes 112 with access to various components of storage system 150. For example, in one embodiment APIs 114 may include function calls exposed by storage system 150 that a given process 112 may invoke, while in other embodiments API 114 may support other types of interprocess communication. In one embodiment, storage devices 230 may be illustrative of storage devices 30 of FIG. 1. Additionally, in one embodiment, any of the components of storage system 150 and/or any of processes 112 may be configured to execute on one or more host devices 20 of FIG. 1, for example as program instructions and data stored as code 50 within a computer-accessible medium such as system memory 25 of FIG. 1.

As described in greater detail below in conjunction with the descriptions of FIG. 3 through 9, storage system 150 may be configured to provide a variety of storage-related services. For example, in one embodiment storage management system 200 may be configured to organize the data stored by storage devices 230 using a file system, such that various processes 112 may store and manipulate data as hierarchical files. Additionally, storage system 150 may be configured to monitor operations to access and/or manipulate stored data and to generate records of such operations. Query system 400 may be configured to provide processes 112 with an interface through which to query the data stored within storage devices 230 by storage management system 200 as well as records of operations to access such data.

Storage Management System and File System

As just noted, in some embodiments storage management system 200 may provide data and control structures for organizing the storage space provided by storage devices 230 into files. In various embodiments, the data structures may include one or more tables configured to store information such as, for example, the identity of each file, its location within storage devices 230 (e.g., a mapping to a particular physical location within a particular storage device), as well as other information about each file as described in greater detail below. Also, in various embodiments, the control structures may include executable routines for manipulating files, such as, for example, function calls for changing file identities and for modifying file content. Collectively, these data and control structures may be referred to herein as a file system, and the particular data formats and protocols implemented by a given file system may be referred to herein as the format of the file system.

In some embodiments, a file system may be integrated into an operating system such that any access to data stored on storage devices 230 is governed by the control and data structures of the file system. Different operating systems may implement different native file systems using different formats, but in some embodiments, a given operating system may include a file system that supports multiple different types of file system formats, including file system formats native to other operating systems. In such embodiments, the various file system formats supported by the file system may be referred to herein as local file systems. Additionally, in some embodiments, a file system may be implemented using multiple layers of functionality arranged in a hierarchy, as illustrated in FIG. 3.

Figure 3:
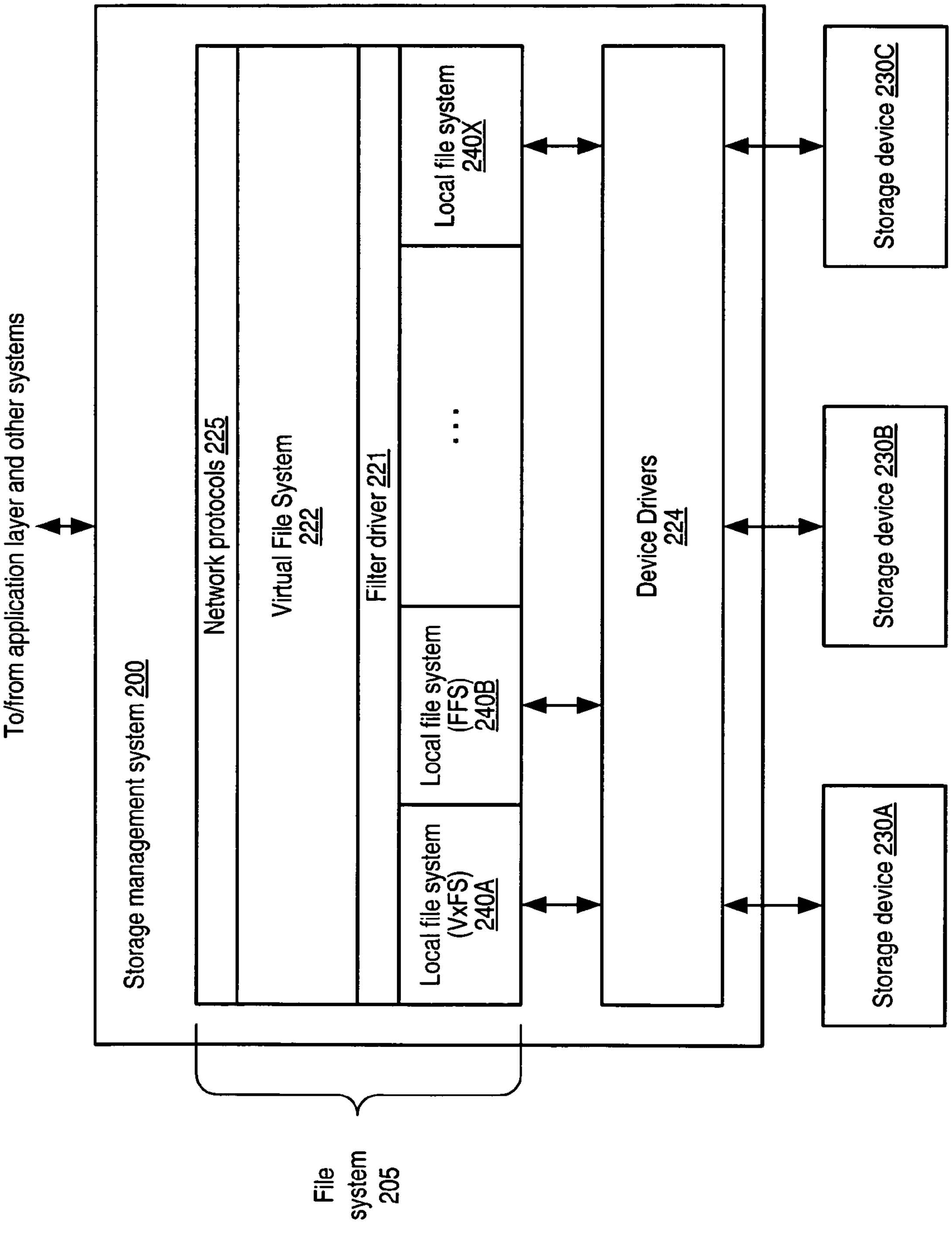
FIG. 3 is a block diagram illustrating one embodiment of a storage management system.

FIG. 3 illustrates one embodiment of storage management system 200. In the illustrated embodiment, storage management system includes a file system 205 configured to interface with one or more device drivers 224, which are in turn configured to interface with storage devices 230. As illustrated within storage system 150 of FIG. 2, the components of storage management system 200 may be configured to execute in kernel space; however, it is contemplated that in some embodiments, some components of storage management system 200 may be configured to execute in user space. Also, in one embodiment, any of the components of storage management system 200 may be configured to execute on one or more host devices 20 of FIG. 1, for example as program instructions and data stored within a computer-accessible medium such as system memory 25 of FIG. 1.

As described above with respect to system 10 of FIG. 1, a given host device 20 may reside in a different computer system from a given storage device 30, and may access that storage device via a network. Likewise, with respect to storage management system 200, in one embodiment a given process such as process 112A may execute remotely and may access storage devices 230 over a network. In the illustrated embodiment, file system 205 includes network protocols 225 to support access to the file system by remote processes. In some embodiments, network protocols 225 may include support for the Network File System (NFS) protocol or the Common Internet File System (CIFS) protocol, for example, although it is contemplated that any suitable network protocol may be employed, and that multiple such protocols may be supported in some embodiments. However, it is also contemplated that in some embodiments, some systems may interact with layers of file system 205 directly, without passing through network protocols 225. For example, in one embodiment query system 400 may be local to the same computer system as storage management system 200, and may be configured to interact with file system 205 through virtual file system 222 rather than network protocols 225.

File system 205 may be configured to support a plurality of local file systems. In the illustrated embodiment, file system 205 includes a VERITAS (VxFS) format local file system 240A, a Berkeley fast file system (FFS) format local file system 240B, and a proprietary (X) format local file system 240X. However, it is contemplated that in other embodiments, any number or combination of local file system formats may be supported by file system 205. To provide a common interface to the various local file systems 240, file system 205 includes a virtual file system 222. In one embodiment, virtual file system 222 may be configured to translate file system operations originating from processes 112 to a format applicable to the particular local file system 240 targeted by each operation. Additionally, in the illustrated embodiment storage management system 200 includes device drivers 224 through which local file systems 240 may access storage devices 230. Device drivers 224 may implement data transfer protocols specific to the types of interfaces employed by storage devices 230. For example, in one embodiment device drivers 224 may provide support for transferring data across SCSI and ATAPI interfaces, though in other embodiments device drivers 224 may support other types and combinations of interfaces.

In the illustrated embodiment, file system 205 also includes filter driver 221. In some embodiments, filter driver 221 may be configured to monitor each operation entering file system 205 and, subsequent to detecting particular types of operations, to cause additional operations to be performed or to alter the behavior of the detected operation. For example, in one embodiment filter driver 221 may be configured to combine multiple write operations into a single write operation to improve file system performance. In another embodiment, filter driver 221 may be configured to compute a signature of a file subsequent to detecting a write to that file. In still another embodiment, filter driver 221 may be configured to store information, such as records, associated with particular files subsequent to detecting certain kinds of operations on those files, as described in greater detail below. It is contemplated that in some embodiments, filter driver 221 may be configured to implement one or more combinations of the aforementioned operations, including other filter operations not specifically mentioned.

It is noted that filter driver 221 is part of file system 205 and not an application or process within user space 210. Consequently, filter driver 221 may be configured to operate independently of applications and processes within the user space 210. Alternatively, or in addition to the above, filter driver 221 may be configured to perform operations in response to requests received from applications or processes within the user space 210.

It is further noted that in some embodiments, kernel space 220 may include processes (not shown) that generate accesses to storage devices 230, similar to user space processes 112. In such embodiments, processes executing in kernel space 220 may be configured to access file system 205 through a kernel-mode API (not shown), in a manner similar to user space processes 112. Thus, in some embodiments, all accesses to storage devices 230 may be processed by file system 205, regardless of the type or space of the process originating the access operation.

Numerous alternative embodiments of storage management system 200 and file system 205 are possible and contemplated. For example, file system 205 may support different numbers and formats of local file systems 240, or only a single local file system 240. In some embodiments, network protocol 225 may be omitted or integrated into a portion of storage management system 200 external to file system 205. Likewise, in some embodiments virtual file system 222 may be omitted or disabled, for example if only a single local file system 240 is in use. Additionally, in some embodiments filter driver 221 may be implemented within a different layer of file system 205. For example, in one embodiment, filter driver 221 may be integrated into virtual file system 222, while in another embodiment, an instance of filter driver 221 may be implemented in each of local file systems 240.

File System Content and Security

As described above, file system 205 may be configured to manage access to a plurality of files stored on storage devices 230. In many embodiments, each stored file may have an associated identity used by the file system to distinguish each file from other files. In one embodiment of file system 205, the identity of a file may be a file name, which may for example include a string of characters such as "filename.txt". However, in embodiments of file system 205 that implement a file hierarchy, such as a hierarchy of folders or directories, all or part of the file hierarchy may be included in the file identity. For example, a given file named "file1.txt" may reside in a directory "smith" that in turn resides in a directory "users". The directory "users" may reside in a directory "test1" that is a top-level or root-level directory within file system 205. In some embodiments, file system 205 may define a single "root directory" to include all root-level directories, where no higher-level directory includes the root directory. In other embodiments, multiple top-level directories may coexist such that no higher-level directory includes any top-level directory. The names of the specific folders or directories in which a given file is located may be referred to herein as the given file's path or path name.

In some embodiments of file system 205 that implement a file hierarchy, a given file's identity may be specified by listing each directory in the path of the file as well as the file name. Referring to the example given above, the identity of the given instance of the file named "file1.txt" may be specified as "/test1/users/smith/file1.txt". It is noted that in some embodiments of file system 205, a file name alone may be insufficient to uniquely identify a given file, whereas a fully specified file identity including path information may be sufficient to uniquely identify a given file. There may, for example, exist a file identified as "/test2/users/smith/file1.txt" that, despite sharing the same file name as the previously mentioned file, is distinct by virtue of its path. It is noted that other methods of representing a given file identity using path and file name information are possible and contemplated. For example, different characters may be used to delimit directory/folder names and file names, or the directory/folder names and file names may be specified in a different order.

The files managed by file system 205 may store application data or program information, which may collectively be referred to as file data, in any of a number of encoding formats. For example, a given file may store plain text in an ASCII-encoded format or data in a proprietary application format, such as a particular word processor or spreadsheet encoding format. Additionally, a given file may store video or audio data or executable program instructions in a binary format. It is contemplated that numerous other types of data and encoding formats, as well as combinations of data and encoding formats, may be used in files as file data.

In addition to managing access to storage devices, the various files stored on storage devices, and the file data in those files as described above, in some embodiments file system 205 may be configured to store information corresponding to one or more given files, which information may be referred to herein as metadata. Generally speaking, metadata may encompass any type of information associated with a file. In various embodiments, metadata may include information such as (but not limited to) the file identity, size, ownership, and file access permissions. Metadata may also include free-form or user-defined data such as records corresponding to file system operations, as described in greater detail below. In some embodiments of file system 205 including file hierarchies such as directories and/or folders, metadata may also be associated with individual directories or folders. Metadata corresponding to a file, directory or folder as well as the data content of files may collectively be referred to herein as file system content.

Figure 4:
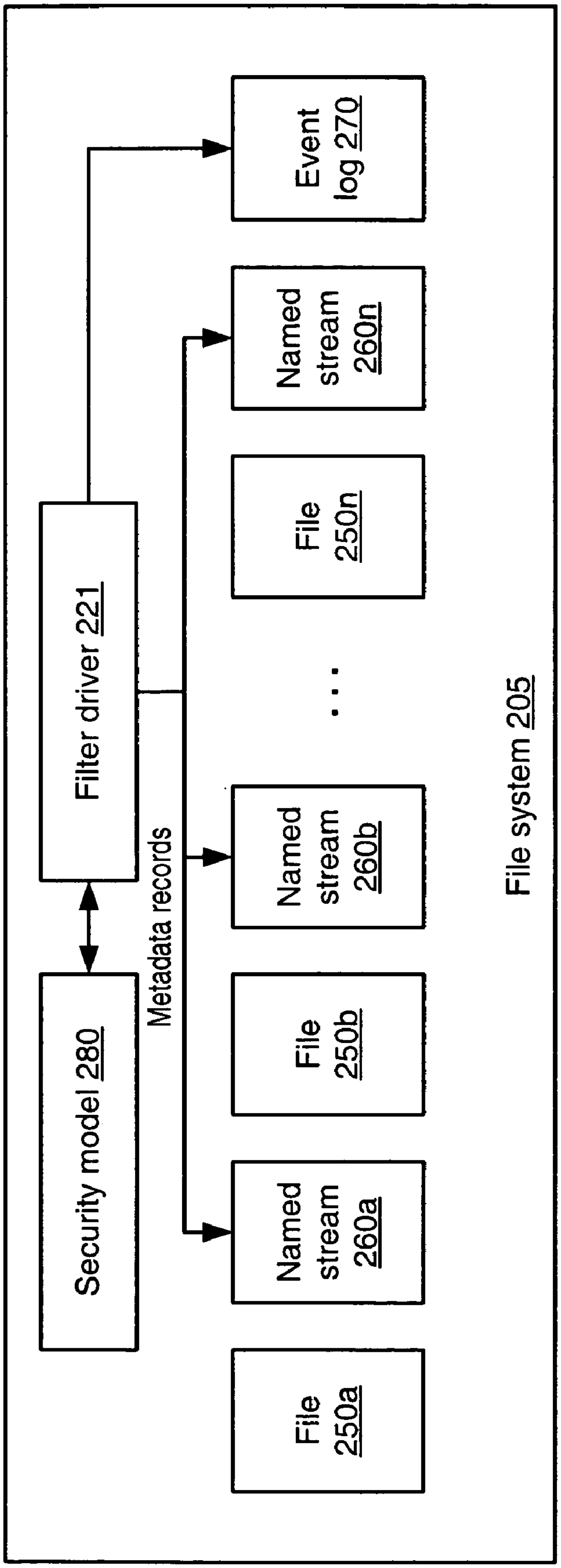
FIG. 4 is a block diagram illustrating one embodiment of a file system configured to store files and associated metadata.

FIG. 4 illustrates one embodiment of a file system configured to store files and associated metadata. The embodiment of file system 205 shown in FIG. 4 may include those elements illustrated in the embodiment of FIG. 3; however, for sake of clarity, some of these elements are not shown. In the illustrated embodiment, file system 205 includes filter driver 221, an arbitrary number of files 250*a-n*, a respective named stream 260*a-n* associated with each of files 250*a-n*, an event log 270, and a security model 280. It is noted that a generic instance of one of files 250*a-n* or named streams 260*a-n* may be referred to respectively as a file 250 or a named stream 260, and that files 250*a-n* and named streams 260*a-n* may be referred to collectively as files 250 and named streams 260, respectively.

Files 250 may be representative of files managed by file system 205, and may in various embodiments be configured to store various types of data and program instructions as described above. In the illustrated embodiment, each of files 250 has a corresponding named stream 260. Each of named streams 260 may be configured to store metadata pertaining to its corresponding file. It is noted that files 250 and named streams 260 may be physically stored on one or more storage devices, such as storage devices 230 of FIG. 2. However, for purposes of illustration, files 250 and named streams 260 are shown as conceptually residing within file system 205.

In some embodiments, filter driver 221 may be configured to access file data stored in a given file 250. For example, filter driver 221 may be configured to detect read and/or write operations received by file system 205, and may responsively cause file data to be read from or written to a given file 250 corresponding to the received operation. In some embodiments, filter driver 221 may be configured to generate metadata corresponding to a given file 250 and store the generated metadata in the corresponding named stream 260. For example, upon detecting a file write operation directed to given file 250, filter driver 221 may be configured to update metadata corresponding to the last modified time of given file 250 and to store the updated metadata within named stream 260. Also, in some embodiments filter driver 221 may be configured to retrieve metadata corresponding to a specified file on behalf of a particular application.

Metadata may be generated in response to various types of file system activity initiated by processes 112 of FIG. 2. In some embodiments, the generated metadata may include records of arbitrary complexity. For example, in one embodiment filter driver 221 may be configured to detect various types of file manipulation operations such as file create, delete, rename, and/or copy operations as well as file read and write operations. In some embodiments, such operations may be detected in-band as described above. After detecting a particular file operation, filter driver 221 may be configured to generate a record of the operation and store the record in the appropriate named stream 260 as metadata of the file 250 targeted by the operation.

More generally, any operation that accesses any aspect of file system content, such as reading or writing of file data or metadata, may be referred to as a file system content access event. In one embodiment, filter driver 221 may be configured to generate a metadata record in response to detecting a file system content access event. It is contemplated that in some embodiments, access events targeting metadata may themselves generate additional metadata. As described in greater detail below, in the illustrated embodiment, event log 270 may be configured to store records of detected file system content access events independently of whether additional metadata is stored in a particular named stream 260 in response to event detection.

The stored metadata record may in various embodiments include various kinds of information about the file 250 and the operation detected, such as the identity of the process generating the operation, file identity, file type, file size, file owner, and/or file permissions, for example. In one embodiment, the record may include a file signature indicative of the content of file 250. A file signature may be a hash-type function of all or a portion of the file contents and may have the property that minor differences in file content yield quantifiably distinct file signatures. For example, the file signature may employ the Message Digest 5 (MD5) algorithm, which may yield different signatures for files differing in content by as little as a single bit, although it is contemplated that any suitable signature-generating algorithm may be employed. The record may also include additional information not specifically listed.

In one embodiment, a given metadata record may be generated and stored in a format that may include data fields along with tags that describe the significance of an associated data field. Such a format may be referred to as a "self-describing" data format. For example, a data element within a metadata record may be delimited by such tag fields, with the generic syntax:

```
<descriptive_tag>data element</descriptive_tag>
```

where the "descriptive_tag" delimiter may describe some aspect of the "data element" field, and may thereby serve to structure the various data elements within a metadata record. It is contemplated that in various embodiments, self-describing data formats may employ any of a variety of syntaxes, which may include different conventions for distinguishing tags from data elements. In some embodiments, a self-describing data format may allow additional structural elements to be defined as desired, for example by allowing additional descriptive tags to be defined. Such embodiments of self-describing data formats may be referred to as extensible as well as self-describing.

In one embodiment, Extensible Markup Language (XML) format, or any data format compliant with any version of XML, may be used as an extensible, self-describing format for storing metadata records, although it is contemplated that in other embodiments, any suitable format may be used, including formats that are not extensible or self-describing. XML-format records may allow arbitrary definition of record fields, according to the desired metadata to be recorded. One example of an XML-format record is as follows:

```
<record sequence="1">
    <path>/test1/foo.pdf</path>
    <type>application/pdf</type>
    <user id=1598>username</user>
    <group id=119>groupname</group>
    <perm>rw-r--r--</perm>
    <md5>d41d8cd98f00b204e9800998ecf8427e</md5>
    <size>0</size>
</record>
```

Such a record may be appended to the named stream (for example, named stream 260*a*) associated with the file (for example, file 250*a*) having the file identity "/test1/foo.pdf" subsequent to, for example, a file create operation. In this case, the number associated with the "record sequence" field indicates that this record is the first record associated with file 250*a*. The "path" field includes the file identity, and the "type" field indicates the file type, which in one embodiment may be provided by the process issuing the file create operation, and in other embodiments may be determined from the extension of the file name or from header information within the file, for example. The "user id" field records both the numerical user id and the textual user name of the user associated with the process issuing the file create operation, and the "group id" field records both the numerical group id and the textual group name of that user. The "perm" field records file permissions associated with file 250*a* in a format specific to the file system 205 and/or the operating system. The "md5" field records an MD5 signature corresponding to the file contents, and the "size" field records the length of file 250*a* in bytes. It is contemplated that in alternative embodiments, filter driver 221 may store records corresponding to detected operations where the records include more or fewer fields, as well as fields having different definitions and content. It is also contemplated that in some embodiments filter driver 221 may encapsulate data read from a given file 250 within the XML format, such that read operations to files may return XML data regardless of the underlying file data format. Likewise, in some embodiments filter driver 221 may be configured to receive XML format data to be written to a given file 250. In such an embodiment, filter driver 221 may be configured to remove XML formatting prior to writing the file data to given file 250.

It is noted that in some embodiments, metadata may be stored in a structure other than a named stream. For example, in one embodiment metadata corresponding to one or more files may be stored in another file in a database format or another format. Also, it is contemplated that in some embodiments, other software modules or components of file system 205 may be configured to generate, store, and/or retrieve metadata. For example, the metadata function of filter driver 221 may be incorporated into or duplicated by another software module.

In the illustrated embodiment, file system 205 includes event log 270. Event log 270 may be a named stream similar to named streams 260; however, rather than being associated with a particular file, event log 270 may be associated directly with file system 205. In some embodiments, file system 205 may include only one event log 270, while in other embodiments, more than one event log 270 may be provided. For example, in one embodiment of file system 205 including a plurality of local file systems 240 as illustrated in FIG. 2, one event log 270 per local file system 240 may be provided.

In some embodiments, filter driver 221 may be configured to store a metadata record in event log 270 in response to detecting a file system operation or event. For example, a read or write operation directed to a particular file 250 may be detected, and subsequently filter driver 221 may store a record indicative of the operation in event log 270. In some embodiments, filter driver 221 may be configured to store metadata records within event log 270 regardless of whether a corresponding metadata record was also stored within a named stream 260. In some embodiments event log 270 may function as a centralized history of all detected operations and events transpiring within file system 205.

Similar to the records stored within named stream 260, the record stored by filter driver 221 in event log 270 may in one embodiment be generated in an extensible, self-describing data format such as the Extensible Markup Language (XML) format, although it is contemplated that in other embodiments, any suitable format may be used. As an example, a given file 250*a* named "/test1/foo.pdf" may be created, modified, and then renamed to file 250*b* "/test1/destination.pdf" in the course of operation of file system 205. In one embodiment, event log 270 may include the following example records subsequent to the rename operation:

```
<record>
    <op>create</op>
    <path>/test1/foo.pdf</path>
</record>
<record>
    <op>modify</op>
    <path>/test1/foo.pdf</path>
</record>
<record>
    <op>rename</op>
    <path>/test1/destination.pdf</path>
    <oldpath>/test1/foo.pdf</oldpath>
</record>
```

In this example, the "op" field of each record indicates the operation performed, while the "path" field indicates the file identity of the file 250*a* operated on. In the case of the file rename operation, the "path" field indicates the file identity of the destination file 250*b* of the rename operation, and the "oldpath" field indicates the file identity of the source file 250*a*. It is contemplated that in alternative embodiments, filter driver 221 may store within event log 270 records including more or fewer fields, as well as fields having different definitions and content. In some embodiments, the event log records may be considered part of file system content along with file data and other metadata.

In one embodiment, access to file system content may be controlled according to a security model. For example, in some embodiments various file system content items, such as files or metadata records, may include sensitive data that should be restricted only to users (or applications or processes executing on behalf of users) having appropriate credentials. In the illustrated embodiment, file system 205 includes security model 280 that may be configured to interact with filter driver 221 to control access to file system content. For example, upon receiving a file system content access operation, filter driver 221 may be configured to convey credentials associated with the operation requestor along with information identifying the requested content. In response, security model 280 may be configured to evaluate the credentials against the request to indicate whether the operation should be allowed to proceed or alternatively, whether the operation should be rejected or restricted in scope. It is contemplated that in some embodiments, security model 280 may be configured to interact with elements of file system 205 other than or in addition to filter driver 221. For example, security model 280 may be implemented at a higher or lower level of the stack of elements of file system 205 illustrated in FIG. 3.

Security model 280 may in various embodiments implement functionality compliant with any suitable credential authentication model. For example, in one embodiment security model 280 may implement a standard Unix-style permission model including user identifiers (UIDs), group identifiers (GIDs), and file permissions. In such a model, a given file system content item such as a file may have a corresponding owner identified by a particular UID and a corresponding group identified by a particular GID, where the GID may be restricted to one of the groups of which the owner is a member. Additionally, the given file system content item may have associated permissions defining the allowable actions on that item for the owner, for a member of group GID other than the owner, and for users other than members of group GID. For example, the owner of a file may have read, write, and execute permissions for that file, whereas other group members may have only read and execute permissions, and non-group members may have only read permissions. In some embodiments, user, group and permission information of a given file 250 may be stored in a metadata record in a corresponding named stream 260. In such embodiments, this information may be distinguished from user and group information associated with specific file system content access operations, records of which may also be stored within a named stream 260 as shown above.

In some embodiments, security model 280 may implement a more sophisticated credential authentication model. For example, rather than relying on users to identify themselves through process information associated with a file system content access request, in one embodiment security model 280 may attempt to establish the identity of a user independently, such as by consulting a directory or validation service that may be implemented externally to file system 205. For example, security model 280 may coordinate with a server implementing the Lightweight Directory Access Protocol (LDAP) to verify the identify of a user requesting access to file system content. Alternatively, in one embodiment security model 280 may implement a version of the Kerberos authentication protocol and may attempt to ensure that a valid Kerberos ticket from a ticket-granting server has been obtained by the user requesting content access. It is contemplated that in various embodiments, security model 280 may implement any of numerous other types of credential authentication models, which may include the use of encrypted keys, challenge-and-response methods, or any other suitable authentication method. For example, security model 280 may implement functionality compatible with Network Information Service (NIS) or Network Information Service Plus (NIS+) protocol, Local Area Network Manager (LAN Manager) protocol, Active Directory protocol, or any other suitable protocol. It is further contemplated that in some embodiments, security model 280 may implement multiple such methods, and may additionally associate specific methods with specific file system content items. For example, some file system content items may use the Unix permission scheme described above, while other items may use this scheme in combination with Kerberos or another method or protocol.

Querying File System Content

As described above, in some embodiments file system 205 may be configured to store various types of file system content. File system 205 may store numerous types of file data within one or more files, and may store metadata of arbitrary complexity corresponding to a given file. File system 205 may also be configured to consume file system content. For example, file system 205 may implement particular storage policies whereby files having certain usage characteristics as indicated in their metadata are assigned to particular types of storage. In one embodiment, for example, files that are more recently used or are accessed by certain types of processes may be assigned to faster types of storage, whereas other files may be assigned to slower storage.

In some embodiments, application or operating system processes external to file system 205 (such as processes 112 of FIG. 2) may also be configured to consume file system content. For example, a programmer writing an application software module may wish to create and manipulate specific files and their associated file data in order to store or retrieve application data. Additionally, such a programmer may wish to perform actions contingent on the metadata characteristics of certain files, such as configuring a backup program to select only files that have been modified since the time of the last backup. In some embodiments, specific file system content may be specified by querying file system content to identify content satisfying particular criteria. The available criteria for querying file system content may depend on the format in which file system content is stored. For example, in one embodiment file system content may be stored in a fixed, non-extensible format, such as a tabular data structure where a data item's description is inherited from row and column definitions rather than from a self-describing format tag. In such an embodiment the criteria by which file system content may be selected may be determined by the defined structure of the format, such as the available row and column definitions. In embodiments where file system content is stored in an extensible, self-describing format, such as the XML format described above, the criteria available for selecting desired file system content may include any of the self-describing features of that content. Generally speaking, any data storage format or organization for which query system 400 may generate a query to select data may be referred to as a queryable format. For example, the XML format may be a queryable format for file system content.

Figure 5:
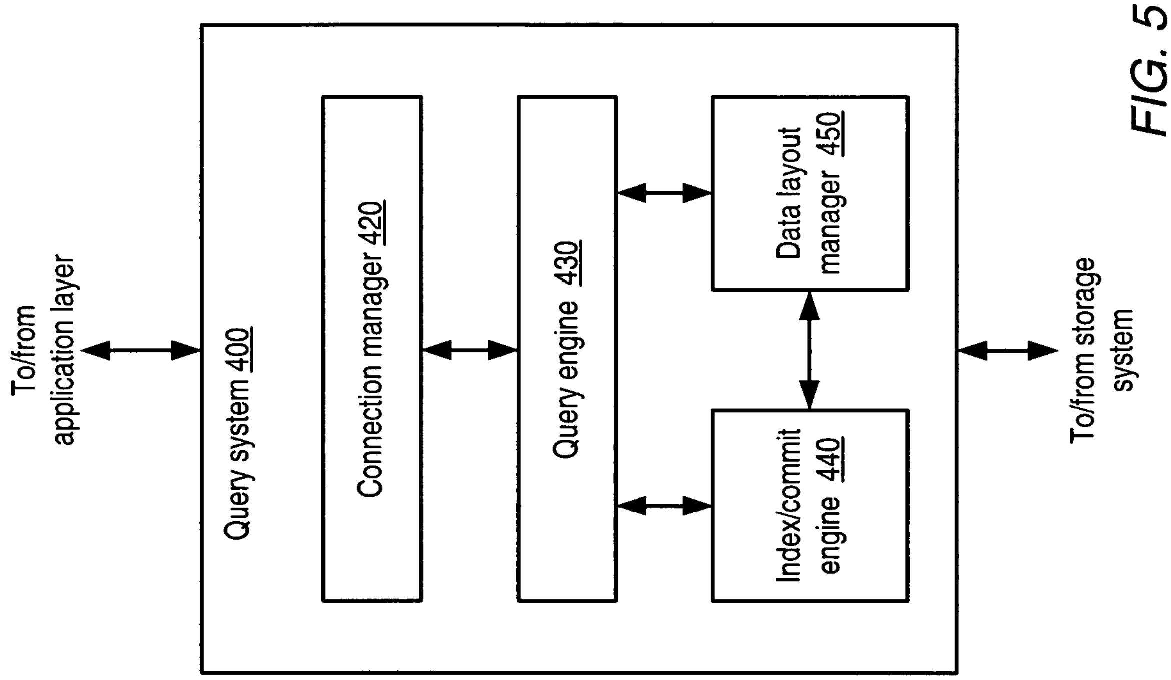
FIG. 5 is a block diagram illustrating one embodiment of a query system.

In the embodiment of storage system 150 illustrated in FIG. 2, query system 400 is configured to provide file system content query capabilities via API 114B to various processes 112. One detailed embodiment of query system 400 is illustrated in FIG. 5. In this embodiment, query system 400 includes a connection manager 420, a query engine 430, an index/commit engine 440, and a data layout manager 450, each described in greater detail below.

Generally speaking, a query may specify how a subset of data is to be selected from a larger set of data, for example through the evaluation of one or more data fields of a record stored in a self-describing format. For example, a user may wish to select all stored records that correspond to the file /test1/foo.pdf for further analysis. Correspondingly, the user may construct a query that specifies the selection of all records having a data field tagged "path" where the data field equals a particular value, such as "/test1/foo.pdf". In some embodiments, it is contemplated that the entirety of file system content may be queried, including file data stored within files 250 as well as metadata stored within named streams 260. Additionally, in some embodiments where file system content access events are recorded within event log 270 as described above, it is contemplated that those recorded events may also be queried.

Queries may be constructed in a query language, which may provide syntactic constructs for the selection of sets of data based on the value of one or more tagged data fields. In some embodiments, a given query language may support procedural features, such as functions, for example, in addition to set-selection features. Further, in some embodiments a given query language may support the embedding within a query of procedural routines coded in other programming languages, such as Java or C, for example. Where the XML format is used to structure file system content, a given application may construct a query to select particular file system content in the XML Query (XQuery) language as specified by the World Wide Web Consortium (W3C) or any future XQuery standard or variant thereof. However, it is contemplated that any suitable query language may be employed.

As noted previously, in the illustrated embodiment a process 112 may generate a query and convey it to query system 400 through API 114. In some embodiments, query system 400 may be configured to support several processes 112 having concurrent queries outstanding at a given time. Further, in some embodiments a querying process 112 may submit its query from a remote computer system via a network. Additionally, a querying process 112 may need to authenticated in some embodiments, for example to restrict access to query system 400. In one embodiment, connection manager 420 may be configured to manage the overhead of establishing and maintaining connections between querying processes 112 and query system 400. For example, connection manager 420 may be configured to provide an authentication interface (such as a username and password interface) whereby querying processes 112 may establish their authority to perform queries. Additionally, in one embodiment connection manager 420 may be configured to maintain any information necessary to support connection-based or session-based semantics for querying processes 112. For example, connection manager 420 may maintain data structures to map queries in progress to their relevant requestors, such that query results are directed to the correct querying process 112.

In one embodiment, query engine 430 may be configured to parse and evaluate queries submitted to query system 400 via connection manager 420. For example, query engine 430 may receive a query requesting the names of all files 250 having been modified by a particular user within a certain range of time. Query engine 430 may parse the query for syntactic correctness, and may return an error condition if the query is malformed. In some embodiments, query engine 430 may also perform structural transformations to the query, for example to decompose the query into multiple queries and/or to optimize the query for performance. Next, query engine 430 may examine metadata records stored in named streams 260 to identify files 250 meeting the specified criteria, returning the names of those files to the querying process 112. In some embodiments, metadata records stored in named streams 260 may themselves be the file system content items selected by a given query. Further, in some embodiments, query engine 430 may be configured to select portions of files, records, or other file system content items in response to a given query. Numerous implementations of query engine 430 configured for parsing and evaluating queries are possible and contemplated.

In some embodiments, query engine 430 may interact directly with storage management system 200 to access file system content in response to evaluation of a query. However, in some instances, query evaluation performance may be improved by creating one or more indexes of file system content and using these indexes to assist in query evaluation. In the illustrated embodiment, index/commit engine 440 may be configured to generate and maintain these indexes, and to provide index information to query engine 430 during the evaluation of queries. (It is contemplated that in some embodiments in which query engine 430 is configured to query file system content directly, index/commit engine 440 may be omitted or may omit the indexing functionality described below.)

Generally speaking, an index may be any data structure that organizes a collection of data according to some aspect or attribute, facilitating querying of the data by the indexed aspect or attribute. For example, in one embodiment an index may be a list of names of all files 250 defined with file system 205, organized alphabetically. In some embodiments, multiple indexes of file system content may be employed. For example, if file system content is frequently queried by name, associated user, and content creation/modification time, individual indexes that sort or organize file system content by each of these attributes may be created. In some embodiments, more complex indexing schemes may be employed, including indexes that combine multiple content attributes into complex state spaces. Additionally, it is contemplated that indexes may be implemented using any suitable data structure, including lists, tables, trees, and higher-order data structures. Indexes may be stored in a particular data format, which may be referred to as the index format. In one embodiment, the XML format may be used as the index format.

The indexes created by index/commit engine 440 may themselves be stored within file system 205. In some embodiments, these indexes may be stored separately from other file system content. In such embodiments, data layout manager 450 may be configured to track the location of indexes within file system 205. In one embodiment, data layout manager 450 may be configured to bypass filter driver 221 while accessing storage associated with indexes, such that in-band metadata corresponding to index accesses is not generated. In such an embodiment, certain inconsistency scenarios involving indexing and metadata may be avoided. For example, if an index/commit engine 440 were to attempt to include metadata of a given index, such as a modification timestamp, within the given index and then to write the given index to storage through filter driver 221, the metadata of the given index following the write might no longer be consistent with the contents of the given index, e.g., if filter driver 221 created a new modification timestamp in response to the write operation.

In some embodiments, a querying process 112 may use a query to modify file system content via query system 400. For example, a query may be used to select a set of data items, such as files 250, from among the available file system content. The selected data items may then be modified, but instead of submitting the modifications directly to file system 205 to be propagated to storage devices 230, query system 400 may coordinate the data updates, thereby presenting an alternate path for file system content modification. However, in embodiments where multiple paths for modifying file system content exist, coordination among these paths may be necessary to prevent conflicting modifications to common data. In one embodiment, index/commit engine 440 may be configured to implement a commit protocol (such as a two-phase commit, for example) to ensure that updates to file system content are consistent.

The indexes maintained by index/commit engine 440 may generally be derivative of file system content, such that when file system content changes (whether due to an update via query system 400, due to activity of a content processor 300, or from a process 112 directly interacting with file system 205), one or more indexes corresponding to the modified content may no longer accurately reflect the new state of the content. For example, if index/commit engine 440 includes an index of file system content by file name, and a given file 250 is renamed by a process 112, the file name-based index may be stale following the renaming. Generally speaking, if an index is current with respect to the state of the indexed data, the index may be said to preserve referential integrity with respect to the indexed data.

If indexed file system content changes, index/commit engine 440 may be configured to preserve referential integrity of its indexes by updating relevant indexes to reflect the changes. For example, in one embodiment index/commit engine 440 may be configured to detect when a change to file system content has occurred, such as by scanning event log 270. In some embodiments, a process or daemon external to index/commit engine 440 may be configured to perform this detection. When a content change is detected, index/commit engine 440 may update one or more indexes affected by the detected event to maintain their referential integrity. For example, if a particular file 250 is deleted, an event record corresponding to the deletion may be detected within event log 270. Index/commit engine 440 may then modify the indexes it maintains to remove references to the deleted file 250.

Applying File System Security Model to Query System

As described above, query system 400 may be configured to allow users to select file system content to be read or modified through queries specifying the desired content.

However, in some instances some or all of the content may be protected within file system 205 by a security model such as security model 280, or by multiple such models. Further, a given user submitting a query may or may not have sufficient privileges or credentials to access such protected content.

Figure 6:
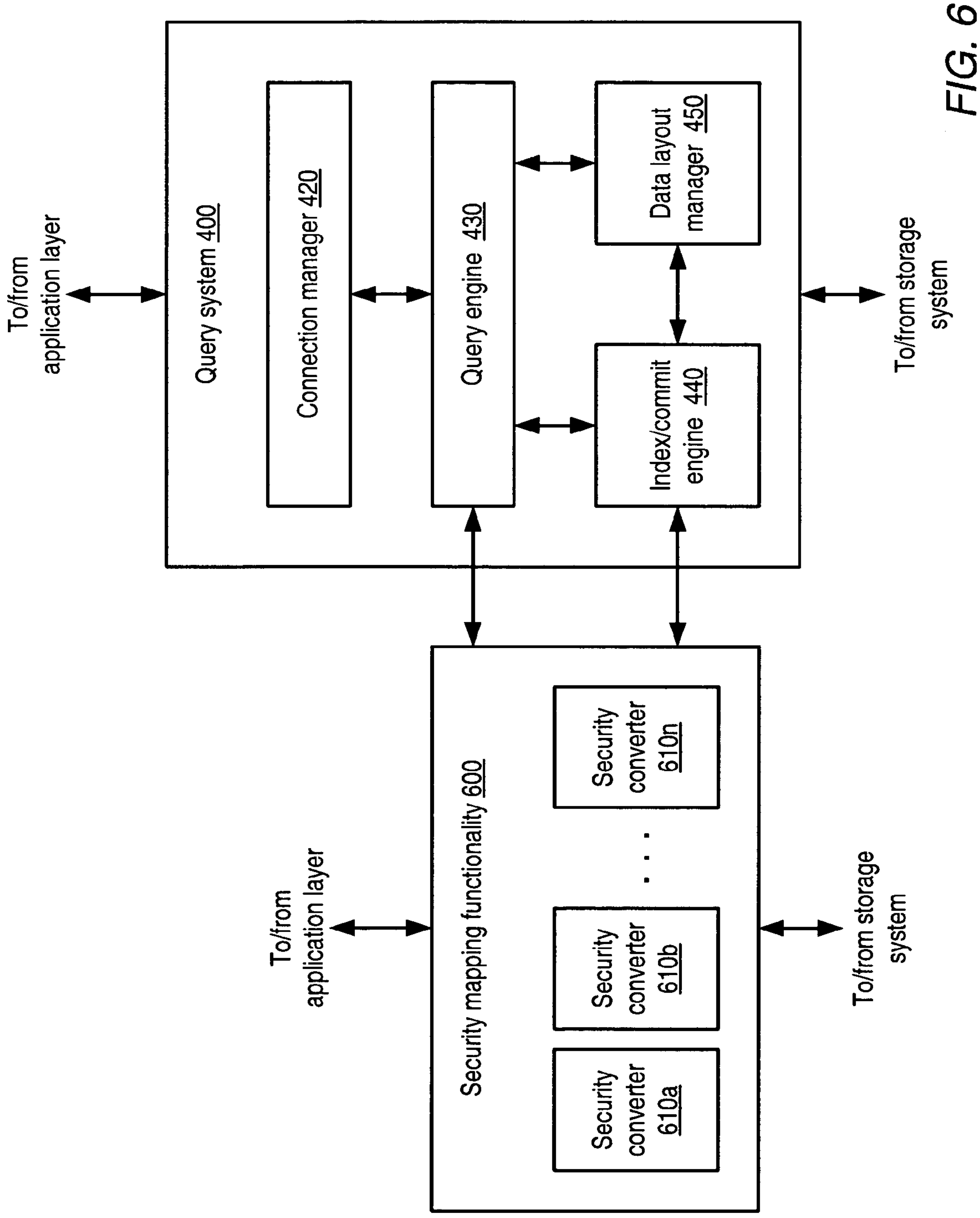
FIG. 6 is a block diagram illustrating one embodiment of a query system configured to interact with security mapping functionality.

In one embodiment, security mapping functionality may be provided to apply one or more file system security models to query system 400, such that access to file system content via query system 400 is controlled subject to the protocols and procedures of the relevant file system security model. One such embodiment of security mapping functionality is illustrated in FIG. 6. In the illustrated embodiment, the embodiment of query system 400 illustrated in FIG. 5 and described above is shown along with security mapping functionality 600. Security mapping functionality 600 includes an arbitrary number of security converters 610*a-n*, each of which may correspond to a respective instance of security model 280 of file system 205 as described in greater detail below. It is contemplated that in embodiments where file system 205 implements only one security model 280, security mapping functionality 600 may include one corresponding security converter 610.

A given security converter 610 may be configured in one embodiment to obtain security information relevant to a particular file system content item, according to corresponding security model 280. Security information may in various embodiments include encryption keys, tokens, tickets, user and/or group identifier strings or values, or any other information that may be employed by a particular security model 280 to control access to file system content. For example, in one embodiment certain file system content items may be protected using a version of the Kerberos authentication protocol, in which the items are individually or collectively delegated one or more passwords used to decrypt authentication tickets submitted by users along with their requests for access to protected items. In such an embodiment, a security converter 610 configured to implement functionality compliant with the implemented version of Kerberos protocol may retrieve the passwords, such as from a Kerberos ticket-granting server. Depending on the security model, security converter 610 may be configured to execute a defined protocol and/or interact with other servers or processes to obtain security information. In embodiments where multiple security converters 610 are provided for respective security models, security mapping functionality 600 may be configured to select an appropriate security converter 610 to obtain security information for a given content item by, for example, examining metadata associated with the given content item indicating its relevant security model 280.

Once security converter 610 has obtained security information for a given file system content item, it may be configured to map or encode such security information in a format suitable for querying by query engine 430, along with other relevant information about the content item to be indexed or stored. For example, in one embodiment query engine 430 may be configured to query file system content stored in XML format as described above. In such an embodiment, security converter 610 may be configured to encode the security information it has obtained using XML tag fields. For example, security converter 610 may generate an XML record such as:

```
<security__record>
    <path>/test1/foo.pdf</path>
    <security__type>security__model</security__type>
    <security__server>serverID</security__server>
```

-continued

```
    <password>password__text</password>
    . . .
</security__record>
```

In this example, the "path" field of the security record may identify the file system content item to which the record corresponds, such as by path name and file name. The "security_type" field may identify the particular security model relevant to the identified content item, such as the Kerberos model or the LDAP model, for example. The "security_server" field may identify a particular server responsible for providing additional authentication information for the identified content item, and the "password" field may include a password to be checked against or used to process a user's credential. It is contemplated that in various embodiments, a given security converter 610 may generate records including more or fewer fields than those shown above, as well as different types of fields, depending on the security model implemented and the desired degree of security information to be obtained. It is also contemplated that in some embodiments, a security record may be generated with respect to a particular metadata element associated with a file. For example, in one embodiment access to some metadata records or fields of a file, such as historical records or audit-trail fields, may be restricted by a particular security model, while other records or fields may not be so restricted. In such an embodiment, a security converter 610 relevant to the particular security model may generate security records corresponding to the protected metadata.

In one embodiment, security records generated by a security converter 610 may be stored within storage management system 200, for example within a named stream 260 corresponding to a file 250 for which the security record was generated. In embodiments of query system 400 that employ indexing, index/commit engine 440 may be configured to index security records generated by security converters 610 along with file system content. For example, as described above, in some embodiments index/commit engine 440 or a daemon external to query system 400 may be configured to scan event log 270 to detect file system content creation or modification events and to update associated indexes. In some such embodiments, the entity configured to detect content-related events and trigger index updates may also be configured to invoke the relevant security converter 610 to obtain a record of security information as described above. The resulting security record may be stored (and, in some embodiments, indexed) such that when a given file system content item is retrieved via query system 400, its associated security record will also be retrieved.

In response to query system 400 receiving a given query, query engine 430 may be configured to select a subset of file system content items (or, in some cases, portions of items, such as subsections or records, for example) that satisfy the given query, as described above. Further, in embodiments that employ indexing, query engine 430 may utilize one or more indexes maintained by index/commit engine 440 to assist in the selection of the resultant subset of file system content items. In one embodiment, if a security information record exists for a given selected content item, query system 400 may be configured to convey the security record along with an indication of the corresponding selected content item to the appropriate security converter 610 via security mapping functionality 600. For example, in one embodiment query engine 430 may be configured to convey the entire selected subset of content items for a given query to security mapping functionality 600, which may in turn be configured to detect the presence of security information records and to direct those records to the appropriate security converters 610 based on the "security_type" field.

Upon receiving a record of security information for a given content item selected by a query, a security converter 610 may be configured to extract the security information from the record, for example by parsing an XML-formatted record, and subsequently to determine whether a credential supplied by a query requester (i.e., a user or process submitting a query to query system 400) satisfies the extracted security information according to the security model 280 implemented by the security converter 610. For example, at the time a query requestor submits a query to query system 400, the requestor may also convey along with the query a credential, such as a password, key, or token, a data structure including required identifying information according to a security model 280, information regarding how to obtain identifying information for the requestor (such as from a server), or any other type of credential defined by security model 280. Alternatively, the requestor may submit the credential directly to security mapping functionality 600 when the query is submitted. Security converter 610 may then perform any necessary operation to determine whether the supplied credential satisfies the security information for the given selected content item. For example, a security converter 610 implementing Kerberos functionality may decrypt a ticket provided by a requestor using a password indicated in the security record to determine whether the ticket correctly indicates the identity of the requestor. A security converter 610 may alternatively or additionally contact another process or server to verify a credential.

Security mapping functionality 600 may be configured to return to the query requestor only those file system content items resulting from the query for which the requestor's credential satisfies a corresponding item's security information, as determined by a security converter 610. For example, for each content item selected by a given query and having a corresponding security record, the appropriate security converter 610 may indicate whether the query requestor's relevant credential does or does not satisfy the requirements indicated by the security record, and security mapping functionality 600 may prevent those content items that fail to satisfy from being returned to the requestor. In one embodiment, if a file system content item has no corresponding security record, it may be returned to a query requestor by default.

In one embodiment, security mapping functionality 600 may be configured to apply security model(s) 280 to query system 400 without query system 400 being aware of the security models in use. In such an embodiment, a daemon external to index/commit engine 440 may be configured to invoke one or more security converters 610 to generate a corresponding security information record when a given file system content item is indexed, which index/commit engine 440 may then treat as ordinary content item metadata. Further, security mapping functionality 600 may be configured to intercept query results before they are returned to query requesters so the results may be filtered by the appropriate security converters 610 as described above. It is contemplated that in some embodiments, all or a portion of security mapping functionality 600 may be implemented within query system 400.

It is noted that in some embodiments that employ indexing, after security information associated with a particular file system content item has been indexed such as described above, the security information associated with that content item may change. For example, a file owner may change permissions associated with a given file, users may be added to or deleted from groups having certain permissions, or users may otherwise gain or lose credentials. In some such embodiments, such changes to security information may be communicated to query system 400, for example by security model 280. In response, in various embodiments query system 400 may be configured to update its indexes to reflect the most current security information, to invalidate some or all existing indexes and rebuild them at a later time, or to maintain a queue or buffer of pending security information changes to be updated within index/commit engine 440. The queue or buffer may be used by query engine 430 and/or security mapping functionality 600 in addition to those security information records returned by a query to check the sufficiency of a user's credentials prior to returning query results.

Figure 7:
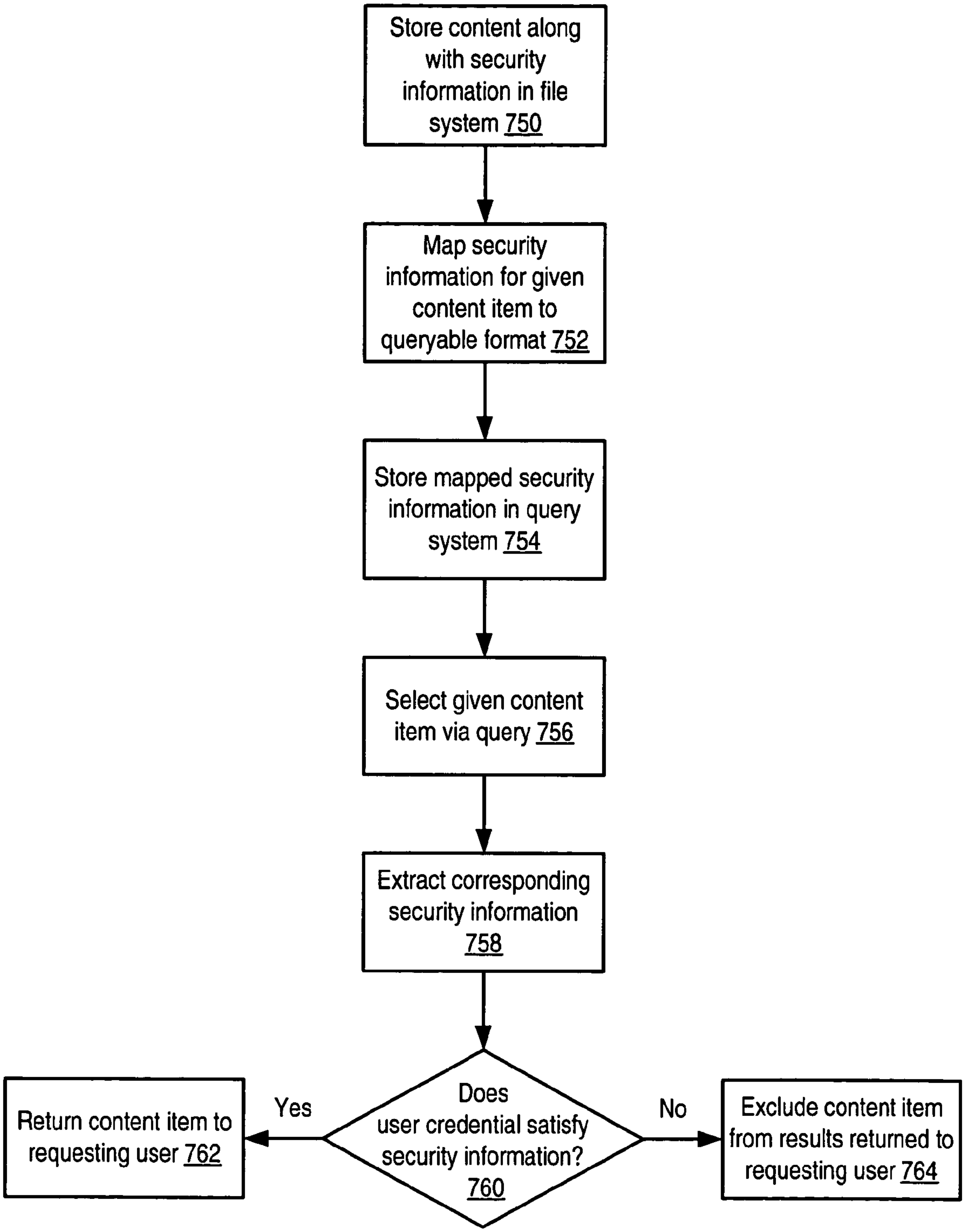
FIG. 7 is a flow diagram illustrating one embodiment of a method of applying a file system security model to a query system.

One embodiment of a method of applying a file system security model to a query system is illustrated in the flow chart of FIG. 7. Referring collectively to FIG. 1-FIG. 7, operation begins in block 750 where file system content is stored along with security information according to a file system security model. For example, a given file system content item may be stored with Unix-style fields and permissions according to one embodiment of file system security model 280.

Subsequent to storing of file system content, security information associated with a given file system content item according to the file system security model is mapped to a queryable format (block 752). For example, in one embodiment security mapping functionality 600 may include one or more security converters 610, each configured to obtain security information associated with the given content item according to its associated security model 280 and to generate a security record reflecting the obtained security information in XML format.

The mapped security information is then stored within a query system along with other file system content information such that the mapped security information may be retrieved in response to a query resulting in selection of the given content item (block 754). For example, in one embodiment, an XML security information record may be stored within storage management system 200 by query system 400. In embodiments that employ indexing, the mapped security information may be indexed along with other metadata corresponding to the given content item, such as by index/commit engine 440, for example. It is noted that in one embodiment, generation of security information corresponding to file system content and storage of such security information within a query system (and indexing, if applicable) may occur in response to the storing or modification of the file system content.

The given file system content item may then be selected by a query (block 756) and the security information in its corresponding security record extracted (block 758). The extracted security information is then compared against a credential of the user requesting the query to determine whether the credential satisfies the security information (block 760). For example, in one embodiment query engine 430 may be configured to select a given file system content item and its corresponding security record in response to a given query, and to convey the security record to a corresponding security converter 610. Responsively, security converter 610 may extract the security information from the record and evaluate it against a credential supplied by the requesting user. If the credential satisfies the security information, the content item may be returned to the requesting user (block 762); otherwise, the content item may be excluded from the results returned to the requesting user (block 764).

In some embodiments, a query system may be configured to provide a security model of its own that may be distinct from the security model 280 provided by file system 205. For example, a query system may define a user namespace with which to identify users who are authorized to access the query system. Further, a query system may define a set of properties within its security model that determine the level of privileges a given user may have with respect to content items accessible by the query system.

Figure 8:
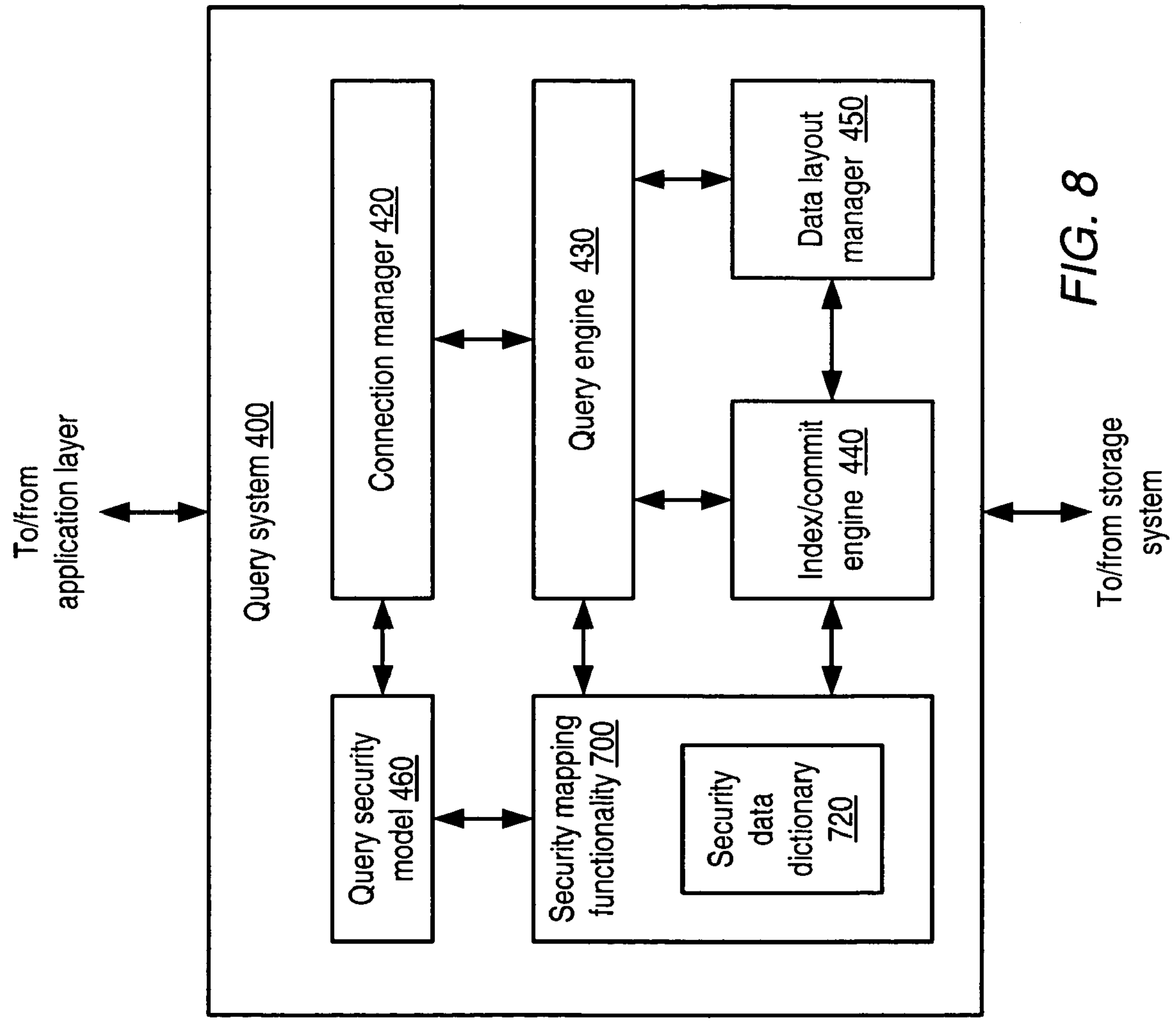
FIG. 8 is a block diagram illustrating one embodiment of a query system including a query security model.

One embodiment of a query system configured to provide a security model distinct from a file system security model, where the file system security model is mapped to the query system security model, is illustrated in FIG. 8. In the illustrated embodiment, query system 400 includes those elements shown in the embodiment of FIG. 6. In addition, query system 400 includes a query security model 460 and security mapping functionality 700, which in turn includes a security data dictionary 720.

In one embodiment, query security model 460 may define a plurality of users authorized to use query system 400. For example, query security model 460 may be configured to maintain a list of user names. In such an embodiment, query security model 460 may be additionally configured to interact with connection manager 420 to verify that a user seeking access is listed as an authorized user according to query security model 460. In some embodiments, query security model 460 may provide additional user authentication capabilities such as user passwords, for example.

Additionally, query security model 460 may define a plurality of roles that may be assigned to a given user, as well as a plurality of capabilities that may be performed by users in certain roles with respect to content accessible via query system 400. A role may be defined using a textual, numerical or any other suitable format. In one embodiment, a unique role may be assigned to each individual user defined within query security model 460. Each individual user may be assigned additional roles that are shared with other users. For example, users A and B may be respectively assigned unique roles 0 and 1, and as members of a common group (such as "accounting", for example) may each be assigned role 2.

Capabilities defined within query security model 460 may, in one embodiment, be textual, numerical or otherwise-formatted identifiers signifying the set of actions that may be taken with respect to a data entity, such as a file system content item, accessible via query system 400. For example, the entire set of capabilities that may be defined for any file system content item accessible within query system 400 may include database manipulation semantics such as update (i.e., modify), read, insert (i.e., create), and delete. A given role may be assigned all, some, or none of these capabilities with respect to a given file system content item. As described in greater detail below, the explicit capabilities assigned to each role for a given file system content item may be stored such that query system 400 may restrict access to file system content items dependent on those stored capabilities and the role of the user or process submitting a given query.

In the illustrated embodiment, the file system security model 280 employed by file system 205 to control access to file system content may be mapped to query security model 460 by security mapping functionality 700. For example, security model 280 may implement a Unix-style permissions model in which a given file system content item has a corresponding owner (e.g., identified through a user ID) and a corresponding group (e.g., identified through a group ID). A permission field may further be used to identify specific file system capabilities the content item owner, associated group members, and non-group members may have with respect to the content item (such as read, write, and execute capabilities, for example). Security mapping functionality 700 may map the identification and capability information defined by security model 280 into security information compatible with query security model 460, and may store the mapped security information within security data dictionary 720, for example as XML data.

As an example, in one embodiment two file system users may be defined within file system 205 as "nur" and "dhruba". Additionally, file system 205 may define two groups as "daemon" and "fcf". Correspondingly, in one embodiment several roles may be defined in XML format within query security model 460 as follows:

```
<role>
    <role-id>1</role-id>
    <role-name>admin</role-name>
    <description>All powerful for this file system
security model </description>
</role>
<role>
    <role-id>2</role-id>
    <role-name>world</role-name>
    <description>any unrecognized user </description>
</role>
<role>
    <role-id>3</role-id>
    <role-name>dhrubarole</role-name>
    <description>user dhruba's role </description>
</role>
<role>
    <role-id>4</role-id>
    <role-name>nurrole</role-name>
    <description> user nur's role </description>
</role>
<role>
    <role-id>6</role-id>
    <role-name>daemon</role-name>
    <description> group daemon's role </description>
</role>
<role>
    <role-id>7</role-id>
    <role-name>fcf</role-name>
    <description> group fcf's role </description>
</role>
```

In this example, roles 3, 4, 6 and 7 have been defined for users "dhruba" and "nur" and groups "daemon" and "fcf", respectively. Also, an additional administrative/superuser role 1 and a world role 2, corresponding to otherwise unrecognized users, have been defined. In some embodiments, these roles may be defined and maintained manually, such as by an administrator of query system 400. In other embodiments, these roles may be defined and maintained automatically. For example, when a user or group is created or deleted within file system 205, file system 205 may be configured to propagate the change to query security model 460. Although each role in the illustrated example has been shown formatted in XML and including "role-id", "role-name" and "description fields, in other embodiments roles may be defined using more, fewer or different fields, or may be formatted in a data format other than XML.

In one embodiment, security data dictionary 720 may be configured to store a mapping of users of query system 400 to the roles defined within query security model 460. Referring to the aforementioned example, in one embodiment security data dictionary 720 may be configured to store the following XML-formatted information regarding users "dhruba" and "nur" and a guest user "guest":

```
<user>
    <user-id>1598</user-id>
    <user-name>dhruba</user-name>
    <description>developer program </description>
    <password>S#@$*&65</password>
    <role-ids>
        <role-id>3</role-id>    <!-users own role ->
        <role-id>6</role-id>    <!-daemon group role ->
        <role-id>7</role-id>    <!-fcf group role ->
    <role-ids>
</user>
<user>
    <user-id>610</user-id>
    <user-name>nur </user-name>
    <description> my_boss </description>
    <password>Simp^45te </password>
    <role-ids>
        <role-id>4</role-id>    <!-user's own role ->
        <role-id>7</role-id>    <!-fcf group's role ->
    <role-ids>
</user>
<user>
    <user-id>100000</user-id>    <!-guest, no password ->
    <user-name>guest </user-name>
    <description> anybody, has no password</description>
    <password> </password>
    <role-ids>
        <role-id>2</role-id>    <!-world role ->
    <role-ids>
</user>
```

In this example, user "dhruba" of query system 400 is associated with user ID 1598 as well as roles 3, 6 and 7 as defined above. User "nur" is associated with user ID 610 as well as roles 4 and 7 defined above. User "guest" is associated with user ID 100000 as well as role 2 defined above. Entries for users "dhruba" and "nur" reflect passwords associated with those users, and each entry also includes a descriptive field. As with the role definitions shown above, in various embodiments, user entries within security data dictionary 720 may include more, fewer or different fields, or may be formatted in a data format other than XML.

When a given file system content item is stored (or, in some embodiments, indexed by index/commit engine 440), in one embodiment security mapping functionality 700 may be configured to utilize the information stored in security data dictionary 720 along with information specific to the given file system content item indicated by file system security model 280 in order to determine the various permissions to be associated with the given content item according to query security model 460. As shown below, content item permissions may include the various capabilities with respect to the given content item that are associated with each of one or more roles. In some embodiments, content item permissions may be stored in a data format such as XML or another data format and stored and/or indexed along with other file system content, such that the permissions associated with a given file system content item may be retrieved when a given query selects that content item. In embodiments where indexing of file system content is not supported, query engine 430 may be configured to store content item permissions in the manner just described.

Continuing in the context of the example roles and security data dictionary 720 contents shown above, in one instance the following file may be selected for indexing by index/commit engine 440, either by the index engine or by a daemon external to query system 400 as described previously:

| | | | |
|---|---|---|---|
| rwxrw-r-- | dhruba | fcf | /test1/foo.pdf |

In this example, the file having path and filename "/test1/foo.pdf" has Unix-type security semantics according to file system security model 280. Specifically, this file is owned by user "dhruba" and is associated with group "fcf". Further, this file has the properties that it may be executed only by user "dhruba", it may be read or written by either user "dhruba" or any user in group "fcf", and may only be read by any user who is neither "dhruba" nor a member of group "fcf".

In one embodiment, when file "/test1/foo.pdf" is indexed, security mapping functionality 700 may be configured to map the aforementioned security semantics to the semantics defined by query security model 460 (e.g., roles and capabilities). For example, security mapping functionality 700 may consult security data dictionary 720 to generate the following permissions for file "/test1/foo.pdf":

```
<permission>
    <roleid> 3 <roleid>    <!-all permission for dhruba ->
    <capability> update,insert,read </capability>
</permission>
<permission>
    <roleid> 7 <roleid>    <!-all permissions for fcf ->
    <capability> update,insert,read </capability>
</permission>
<permission>
    <roleid> 2 <roleid>    <!-read permission for others->
    <capability> read </capability>
</permission>
```

In this example, security mapping functionality 700 maps the owner and group fields associated with the file to roles 3 and 7, respectively, as these roles are indicated within security data dictionary 720. Additionally, security mapping functionality 700 creates an explicit permission field for role 2 (i.e., a non-owner, non-group user). For each of these roles, security mapping functionality 700 maps the permissions of file system security model 280 to corresponding capabilities defined by query security model 460. For example, an "executable" property within file system 205 may have no corresponding mapping within query system 400, while a "write" property within file system 205 may map to both an "update" and an "insert" capability within query system 400. Other capabilities and mappings are possible and contemplated. For example, as described above, in various embodiments file system security model 280 may use fields different from or in addition to those described above to determine user privileges, according to any of a number of authentication protocols. In such embodiments, security mapping functionality 700 may be configured to determine an appropriate mapping of the file system security information onto the security information defined by query security model 460.

As mentioned above, the permissions generated by security mapping functionality 700 may be stored in one or more indexes along with other file system content information or otherwise stored within query system 400. When a given file system content item (or, in some embodiments, a portion of a given item) is selected by query engine 430 based on a given query, the permissions associated with the given content item may be examined and compared with the role of the user performing the given query. If the content item permissions allow the requested capability for that role, query system 400 may be configured to return the given content item to the user performing the given query; otherwise, query system 400 may suppress the given content item from the query results. Referring to the above example, if user "dhruba" submits a query seeking to read file "/test1/foo.pdf", the associated permissions indicate that corresponding role 3 has the "read" capability, and the file may be returned as part of the query results. However, if user "jones" who is not a member of group "fcf" submits a query seeking to modify some aspect of file "/test1/foo.pdf", the associated permissions indicate that corresponding role 2 has only "read" capability with respect to that file, and query engine 430 or another module within query system 400 may suppress file "/test1/foo.pdf" from the results returned to user "jones".

Figure 9:
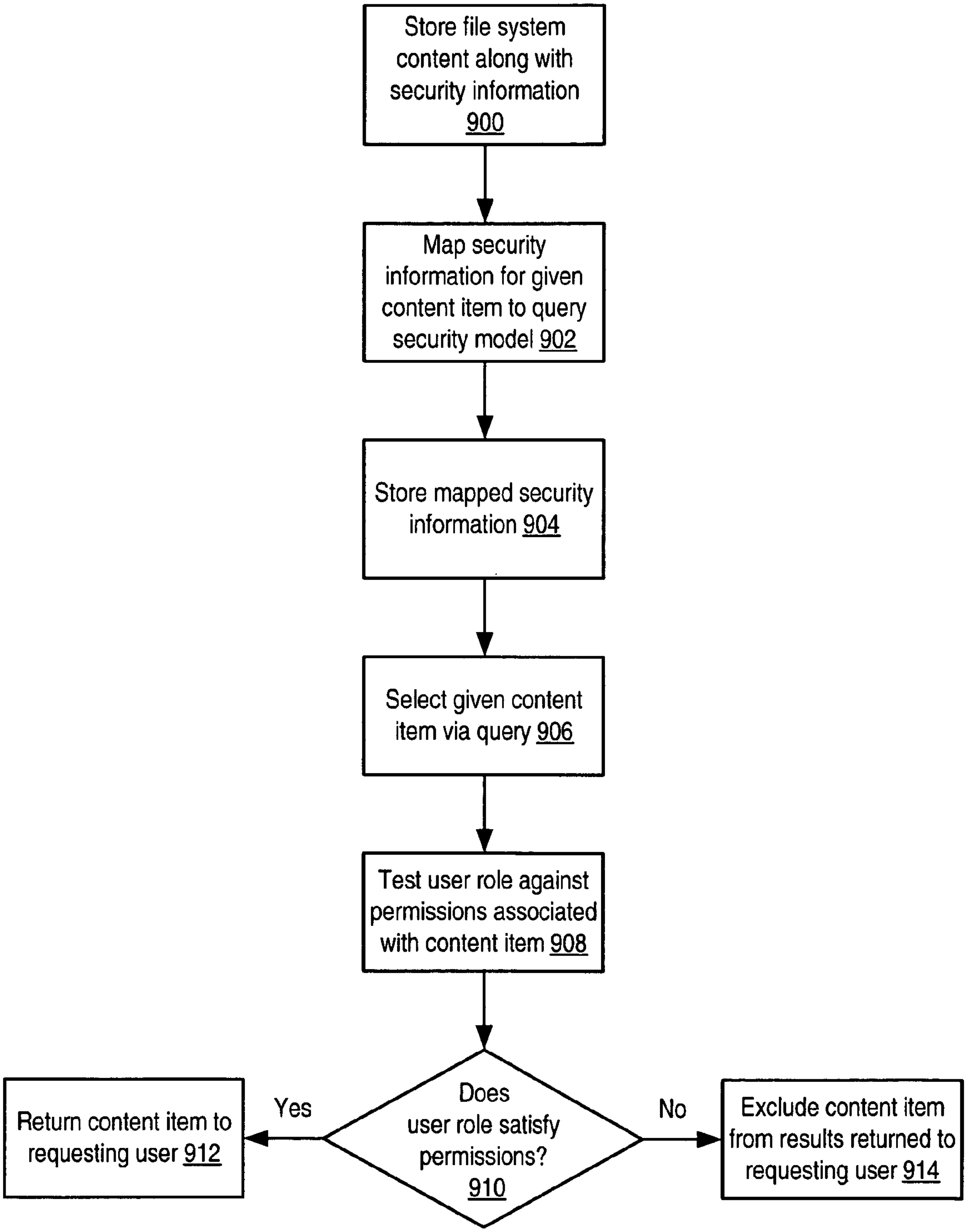
FIG. 9 is a flow diagram illustrating one embodiment of a method of applying a file system security model to a query system security model.

A flow chart illustrating one embodiment of a method of mapping a file system security model to a query system security model is illustrated in FIG. 9. Referring collectively to FIG. 1-4, FIG. 8 and FIG. 9, operation begins in block 900 where file system content is stored along with security information according to a file system security model. For example, a given file system content item may be stored with Unix-style fields and permissions according to one embodiment of file system security model 280.

Subsequent to storing of file system content, security information associated with a given file system content item according to the file system security model is mapped to security information according to a query security model (block 902). For example, in one embodiment security mapping functionality 700 may be configured to map file system fields and permissions to query system roles and capabilities, according to roles and capabilities defined in query security model 460 and user mappings stored in security data dictionary 720.

After mapping, a record of query system security information for the given file system content item is stored such that the record may be retrieved if the given file system content item is selected by a given query (block 904). For example, in one embodiment a record of permissions associated with the given content item may be generated in XML format and indexed along with other information about the given content item. It is noted that in one embodiment, generation of security information corresponding to file system content and storage of such security information within a query system (and indexing, if applicable) may occur in response to the storing or modification of the file system content.

Subsequently, the given file system content item may be selected by a query (block 906) and its associated record of permissions tested against the role(s) associated with the user submitting the query (blocks 908-910). For example, in one embodiment query system 400 may be configured to identify whether any role indicated in the record of permissions corresponds with the user submitting the query according to security mapping functionality 700, and for any corresponding role, query system 400 may determine whether a capability of that role for the given content item matches the capability requested by the query. If the requested capability is permitted according to the record, the content item is returned to the user requesting the query (block 912); otherwise, the content item is suppressed from the results returned to the user (block 914).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:

a storage device configured to store file system content items including a plurality of files and metadata records associated with said files, wherein each of said files is associated with a respective file identity;

a file system configured to manage application accesses to said storage device, to store said file system content items to said storage device, and to implement a first security model, wherein said first security model is configured to control access to said file system content items, wherein said file system is further configured to implement a file system application programming interface (API), wherein said file system API is configured to receive a request from an application distinct from said file system to access one or more particular ones of said plurality of files, wherein said request is dependent upon respective file identities of said one or more particular files;

a query system configured to query said file system content items in response to receiving, via a query API, a query directed to said file system content items from said application, wherein said query is formulated in a query language, wherein to query said file system content items, said query system is further configured to evaluate said query, and wherein said query system is distinct from said file system; and security mapping functionality configured to apply said first security model to said query system such that application accesses to said file system content via said query API occur dependent upon security information included in said first security model.

2. The system as recited in claim 1, wherein said security mapping functionality includes a security converter corresponding to said first security model, wherein to apply said first security model to said query system, said security converter is further configured to map security information corresponding to a given file system content item to a queryable format, and wherein said query system is further configured to store said mapped security information.

3. The system as recited in claim 2, wherein in response to a given query, said query system is further configured to select said given file system content item according to said given query and to convey to said security converter an indication of said given file system content item along with corresponding mapped security information, wherein said security converter is further configured to determine whether a credential of a requestor of said given query satisfies said corresponding mapped security information, and wherein said security mapping functionality is further configured to return said given file system content item to said requestor only if said credential satisfies corresponding mapped security information.

4. The system as recited in claim 3, wherein said query system is further configured to store said mapped security information in an index and to select said given file system content item according to said index.

5. The system as recited in claim 2, wherein said file system is further configured to implement a plurality of security models each configured to control access to a respective portion of said file system content items, and wherein said security mapping functionality includes a respective security converter corresponding to each of said plurality of security models.

6. The system as recited in claim 1, wherein said query system is configured to implement a second security model, and wherein to apply said first security model to said query system, said query system is further configured to map said first security model to said second security model.

7. The system as recited in claim 6, wherein said security mapping functionality includes a security data dictionary implemented within said query system, and wherein said second security model includes a plurality of users, a plurality of roles, and a plurality of capabilities.

8. The system as recited in claim 1, wherein at least a portion of said file system content items is stored in a data format compliant with a version of Extensible Markup Language (XML) format, and wherein said query system is configured to evaluate a version of XML Query (XQuery) language.

9. The system as recited in claim 1, wherein said first security model includes functionality compliant with a version of Kerberos authentication protocol, a version of Lightweight Directory Access Protocol (LDAP), a version of Network Information Service (NIS) protocol, a version of Local Area Network Manager (LAN Manager) protocol, or a version of Active Directory protocol.

10. A method, comprising:

storing file system content items to a storage device, wherein said file system content items include a plurality of files and metadata records associated with said files, wherein each of said files is associated with a respective file identity;

a file system managing application accesses to said storage device, storing said file system content items to said storage device, and implementing a first security model, wherein said first security model is configured to control access to said file system content items;

said file system receiving, via a file system application programming interface (API), a request from an application distinct from said file system to access one or more particular ones of said plurality of files, wherein said request is dependent upon respective file identities of said one or more particular files;

a query system querying said file system content items in response to receiving, via a query API, a query directed to said file system content items from said application, wherein said query is formulated in a query language, wherein querying said file system content items comprises evaluating said query, and wherein said query system is distinct from said file system; and security mapping functionality applying said first security model to a query system configured to query said file system content such that application accesses to said file system content via said query API occur dependent upon security information included in said first security model.

11. The method as recited in claim 10, wherein said security mapping functionality applying said first security model to said query system includes mapping security information corresponding to a given file system content item to a queryable format, and wherein the method further comprises said query system storing said mapped security information.

12. The method as recited in claim 11, further comprising:

in response to a given query, said query system selecting said given file system content item according to said given query;

determining whether a credential of a requestor of said given query satisfies mapped security information corresponding to said given file system content item; and returning said given file system content item to said requestor only if said credential satisfies corresponding mapped security information.

13. The method as recited in claim 12, further comprising storing said mapped security information in an index, and wherein selecting said given file system content item according to said given query includes selecting said given file system content item according to said index.

14. The method as recited in claim 11, further comprising:

implementing a plurality of security models each configured to control access to a respective portion of said file system content items; and applying each of said plurality of security models to said query system.

15. The method as recited in claim 10, wherein said query system is configured to implement a second security model, and wherein applying said first security model to said query system includes mapping said first security model to said second security model.

16. The method as recited in claim 15, wherein said second security model includes a plurality of users, a plurality of roles, and a plurality of capabilities.

17. The method as recited in claim 10, wherein at least a portion of said file system content items is stored in a data format compliant with a version of Extensible Markup Language (XML) format, and wherein said query system is configured to evaluate a version of XML Query (XQuery) language.

18. The method as recited in claim 10, wherein said first security model includes functionality compliant with a version of Kerberos authentication protocol, a version of Lightweight Directory Access Protocol (LDAP), a version of Network Information Service (NIS) protocol, a version of Local Area Network Manager (LAN Manager) protocol, or a version of Active Directory protocol.

19. A computer-accessible storage medium comprising program instructions, wherein the program instructions are executable to implement:

storing file system content items to a storage device, wherein said file system content items include a plurality of files and metadata records associated with said files, wherein each of said files is associated with a respective file identity;

a file system managing application accesses to said storage device, storing said file system content items to said storage device, and implementing a first security model, wherein said first security model is configured to control access to said file system content items;

said file system receiving, via a file system application programming interface (API), a request from an application distinct from said file system to access one or more particular ones of said plurality of files, wherein said request is dependent upon respective file identities of said one or more particular files;

a query system querying said file system content items in response to receiving, via a query API, a query directed to said file system content items from said application, wherein said query is formulated in a query language, wherein querying said file system content items comprises evaluating said query, and wherein said query system is distinct from said file system; and security mapping functionality applying said first security model to a query system configured to query said file system content such that application accesses to said file system content via said query API occur dependent upon security information included in said first security model.

20. The computer-accessible storage medium as recited in claim 19, wherein said security mapping functionality applying said first security model to said query system includes mapping security information corresponding to a given file system content item to a queryable format, and wherein said program instructions are further executable to implement said query system storing said mapped security information.

21. The computer-accessible storage medium as recited in claim 20, wherein the program instructions are further executable to:

implement a plurality of security models each configured to control access to a respective portion of said file system content items; and apply each of said plurality of security models to said query system.

22. The computer-accessible storage medium as recited in claim 19, wherein the program instructions are further executable to implement:

in response to a given query, said query system selecting said given file system content item according to said given query;

determining whether a credential of a requestor of said given query satisfies mapped security information corresponding to said given file system content item; and returning said given file system content item to said requestor only if said credential satisfies corresponding mapped security information.

23. The computer-accessible storage medium as recited in claim 22, wherein the program instructions are further executable to store said mapped security information in an index, and wherein selecting said given file system content item according to said given query includes selecting said given file system content item according to said index.

24. The computer-accessible storage medium as recited in claim 19, wherein said query system is configured to implement a second security model, and wherein applying said first security model to said query system includes mapping said first security model to said second security model.

25. The computer-accessible storage medium as recited in claim 24, wherein said second security model includes a plurality of users, a plurality of roles, and a plurality of capabilities.

26. The computer-accessible storage medium as recited in claim 19, wherein at least a portion of said file system content items is stored in a data format compliant with a version of Extensible Markup Language (XML) format, and wherein said query system is configured to evaluate a version of XML Query (XQuery) language.

27. The computer-accessible storage medium as recited in claim 19, wherein said first security model includes functionality compliant with a version of Kerberos authentication protocol, a version of Lightweight Directory Access Protocol (LDAP), a version of Network Information Service (NIS) protocol, a version of Local Area Network Manager (LAN Manager) protocol, or a version of Active Directory protocol.

* * * * *